United States Patent
Encina et al.

(10) Patent No.: US 7,707,206 B2
(45) Date of Patent: Apr. 27, 2010

(54) DOCUMENT PROCESSING

(75) Inventors: Nicolas Encina, Charlestown, MA (US); Kevin Gilpin, Brookline, MA (US); Dennis Underwood, Jamaica Plain, MA (US)

(73) Assignee: Praxeon, Inc., Cambridge, MA (US)

( * ) Notice: Subject to any disclaimer, the term of this patent is extended or adjusted under 35 U.S.C. 154(b) by 0 days.

(21) Appl. No.: 11/525,245

(22) Filed: Sep. 21, 2006

(65) Prior Publication Data
US 2008/0140616 A1    Jun. 12, 2008

Related U.S. Application Data

(60) Provisional application No. 60/719,101, filed on Sep. 21, 2005, provisional application No. 60/719,100, filed on Sep. 21, 2005.

(51) Int. Cl.
*G06F 17/30* (2006.01)
*G06F 7/00* (2006.01)

(52) U.S. Cl. ...................... 707/716; 707/728

(58) Field of Classification Search ............. 703/3; 700/1; 713/168; 358/1.13; 435/7.23; 707/3, 707/5, 4
See application file for complete search history.

(56) References Cited

U.S. PATENT DOCUMENTS

| | | | |
|---|---|---|---|
| 2003/0227643 A1* | 12/2003 | Reddy et al. ............... | 358/1.13 |
| 2005/0033452 A1* | 2/2005 | Milne et al. ................ | 700/1 |
| 2005/0124010 A1* | 6/2005 | Short et al. ................ | 435/7.23 |
| 2005/0182933 A1* | 8/2005 | Ritz et al. ................. | 713/168 |
| 2005/0188306 A1* | 8/2005 | Mackenzie ................. | 715/530 |

* cited by examiner

Primary Examiner—Charles Rones
Assistant Examiner—Fariborz Khoshnoodi
(74) Attorney, Agent, or Firm—Kristofer E. Elbing

(57) ABSTRACT

A search system and method are disclosed. In one general aspect the method features fingerprinting digitally stored documents and queries based on one or more topic models. Similarities between document and query fingerprints can be detected to search for documents. Topic summaries can also be derived from the documents and queries based on the topic models.

35 Claims, 17 Drawing Sheets

Drugs

Interferon >

Immunosuppressant >

Pemoline >

MODAFINIL >

Pemoline
A central nervous system stimulant used in fatigue and depressive states and to treat hyperkinetic disorders in children.

All Clinical Trials Case report Differential diagnosis Review Meta-analysis

[Bupropion: an effective new aid for smoking cessation]

*EJ Wagena, MP Zeegers, MJ Huibers, NH Chavannes, CP van Schayc*

Review Antidepressants for smoking cessation.

*JR Hughes, LF Stead, T Lancaster*

BACKGROUND: There at least two reasons to believe antidepressants mig nicotine withdrawal, and smoking cessation sometimes precipitates depre: that maintain smoking. Antidepressants may substitute for this effect. OBJE Review Antidepressants for smoking cessation.

*J Hughes, L Stead, T Lancaster*

BACKGROUND: There are at least two theoretical reasons to believe antide produce depressive symptoms or precipitate a major depressive episode a antidepressant effects that maintain smoking, and antidepressants may su Review Should nortriptyline be used as a first-line aid to help smok meta-analysis.

*EJ Wagena, P Knipschild, MP Zeegers*

OBJECTIVES: The objective of this paper is to evaluate the efficacy of nortrip sustained release. DATA SOURCES: Randomized trials were identified by ( clinical trials; (3) searching references of identified studies and screening a

FIG. 7

- Disease [105]
  - Addiction [1]
  - + Anxiety Disorder [13]
  - Attention Deficit Disorder [2]
  - + Cognitive Disturbance [4]
  - + Dependence [6]
  - + Depression [73]
  - - Disorder by Site [57]
    - Akathisia, Drug-Induced [1]
    - - Cardiovascular Diseases [15]
      - + Arrhythmia [3]
      - Atrial Fibrillation [1]
      - Cerebrovascular Accident [1]
      - Ebstein's Anomaly [1]
      - - Heart Diseases [8]
        - + Arrhythmia [3]
        - Atrial Fibrillation [1]
        - Ebstein's Anomaly [1]
        - Myocardial Infarction [1]
        - + Tachycardia [2]
        - Torsades de Pointes [1]
        - + Ventricular Arrhythmia [1]

FIG. 12

Tachycardia

The antidepressant drug fluoxetine is an inhibitor of human ether-a-go-go-related gene (HERG) potassium channels. 

D Thomas, B Gut, G Wendt-Nordahl, J Kiehn     J Pharmacol Exp Ther    Jan 25, 200

Fluoxetine is a commonly prescribed antidepressant compound. Its action is primarily attributed to selective inhibition of the reuptake of serotonin (5-hydroxytryptamine) in the central nervous system. Although this group of antidepressant drugs is generally believed to cause fewer proarrhythmic side effects compared with tricyclic antidepressants, serious concerns have been raised by case reports ...

Heart Diseases

Review A review of the evidence for the efficacy and safety of trazodone in insomnia. 

WB Mendelson     J Clin Psychiatry    Apr 08, 200

OBJECTIVE: Trazodone, a triazolopyridine antidepressant, is currently the second most commonly prescribed agent for the treatment of insomnia due to its sedating qualities. Given trazodone's widespread use, a careful review of the literature was conducted to assess its efficacy and side effects when given for treatment of insomnia. DATA SOURCES: In April 2003, a MEDLINE search was conducted using t Myocardial Infarction Review Making advances where it matters: improving outcomes in mood and anxiety disorders. 

RN Golden     CNS Spectr    Jun 07, 200

Mood and anxiety disorders are among the most prevalent psychiatric illnesses and are associated with considerable morbidity and mortality. Selective serotonin reuptake inhibitors (SSRIs) are safe and effective treatments for major depression and anxiety disorders, an have become the most widely prescribed antidepressants worldwide. However, several issues limit SSRI treatment outcomes. Although

FIG. 13

- + Depression [73]
- - Sexual Dysfunctions, Psychological [13]
    - Impotence [4]
- Insomnia [9]
- Xerostomia [8]
- - Epilepsy [7]
    - Convulsions [3]
- - Hypertension [6]
    - Portal Hypertension [1]
- + Headache Disorders [6]

FIG. 16

Synonym Table

|  |  |  | Subjects | | | |
|---|---|---|---|---|---|---|
|  |  |  | FDADrugs | GO | MeSH | NCI Thesaurus |
|  |  |  | cell | cell | Cells | Cell |
| Synonyms | Cell Type | cell type |  |  |  | ☑ |
|  | Normal Cell | normal cell |  |  |  | ☑ |
|  | cell | cell | ☑ | ☑ | ☑ | ☑ |

Removed: cell, cell

☐ Requires Future Review

[　　　　　　　] Trac ticket number

[ Submit Changes ]

Norepinephrine ◊ >

Procainamide ◊ > more...

Norepinephrine
Precursor of
epinephrine that is
secreted by the adrenal
medulla and is a
widespread central and
autonomic
neurotransmitter.
Norepinephrine is the
principal transmitter of
most postganglionic sympathetic fibers and of
the diffuse projection system in the brain arising
from the locus ceruleus. It is also found in
plants and is used pharmacologically as a
sympathomimetic.

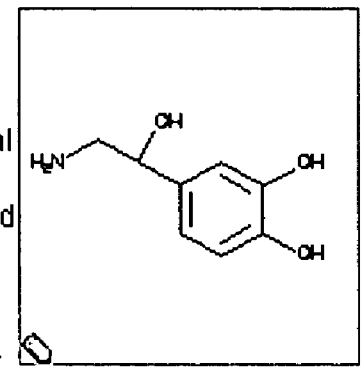

DOCUMENT PROCESSING

CROSS-REFERENCE TO RELATED APPLICATIONS

This application claims the benefit of U.S. Provisional Application Nos. 60/719,100 and 60/719,101, both filed on Sep. 21, 2005, which are herein incorporated by reference.

FIELD OF THE INVENTION

The present invention relates generally to a system and method for accessing documents, such as to search, filter, and/or organize them. The documents accessed can include a variety of types, such as web pages, text files, structured and unstructured data repositories, emails, xml, presentations, news feeds, and publications, in English or other languages, across public, private, or vendor sites. In one aspect, the invention can employ domain-aware classifications and definitions to extract relevant terms, ideas, meanings, and messages, which can be expressed as a fingerprint, from a document such that subsequent searches may precisely determine the level of relevance to the input query.

BACKGROUND OF THE INVENTION

Document search technologies determine which documents in a large collection best match an input search expression. This search expression is typically a few words that the user expects to find in the document, though it may utilize more specialized facilities such as Boolean logic. When many documents have been written on a particular subject, a keyword search will match a large fraction of the document collection. The problem then becomes how to prioritize the documents in this 'hit list' by determining their relevance to the original query. In the absence of additional information, it is difficult for Boolean-based document search technologies to do a good job of prioritizing the hit list. If the user puts too many terms in the search, then many relevant documents are excluded. If the search contains too few terms, then the hit list is too long. Furthermore, Boolean search clauses are difficult to enter into a computer and hard for many users to understand.

SUMMARY OF THE INVENTION

In one general aspect, the invention features a search system that includes a document interface operative to access digitally stored documents and a topic model interface operative to access one or more digitally stored topic models. Document fingerprinting logic is responsive to the topic models and documents, and is operative to create document fingerprints that identify topics from the models in the documents. The system also includes a query interface is operative to receive queries and query fingerprinting logic responsive to the topic models and queries through the query interface, and operative to create query fingerprints that identify topics from the topic models in the queries. Search logic is operative to identify one or more of the documents that are relevant to the queries, based on the query and document fingerprints.

In preferred embodiments, the search logic can include an indexer operative to index the document fingerprints, and a search engine operative to search the index based on the query fingerprints. The system can further include analysis and augmentation logic operative to modify the document and/or query fingerprints before processing by the indexer or search engine. The analysis and augmentation logic can be responsive to curation input. The analysis and augmentation logic can include context-sensitive meaning scope adjustment logic operative to expand or restrict topics identified by a term in a fingerprint to a set of the meanings associated with that term. The analysis and augmentation logic can include species augmentation logic operative to add specific examples of a generic topic. The species augmentation logic can operate based on chemical similarity or biological sequence similarity. The species augmentation logic can operate based on predefined hierarchical relationships between topics. The system can further include a ranker responsive to the stored topic models and operative to rank topics from a set of fingerprints or search engine results. The system can further include a result presentation interface responsive to the search engine and operative to present results to the user in a manner that is based on the document fingerprints. The system can further include an alert interface operative to generate alerts based on the fingerprints. The topic models can include topical models and location models. The topic models can include topical models and taxonomic models. The topic models can include topical models and biographical models. The topic models can include topical models and historical models. The topic models can include topical models and disease diagnosis models. The topic models can include topical models and disease treatment models. The topic models can include topical models and chemical models. The topic models can include topical models and genetic models. The topic models can include medical treatment and diagnosis models. The topic models can include topical models and industrial classification models. The query fingerprinting logic and the document fingerprinting logic can operate in the same way. The system can further include a topical model update interface operative to update the topical models. The topical model update interface can be responsive to curation input. The system can further include a topical model version management system operative to selectively update a subset of document fingerprints in response to changes to the stored topical models. The query fingerprinting logic can be operative to generate fingerprints based on free-form naturally posed queries. The query interface can be part of a syndication filtering tool. The system can further include a feedback mechanism responsive to user feedback to update a syndication query fingerprint. The query interface can be part of a syndication filtering tool that includes a plug-in interface to a document access tool. The system can further include a feedback mechanism responsive to user feedback to update a syndication query fingerprint for the syndication tool through the plug-in interface. The topic models can include hierarchical concept maps that map one or more ancestor concepts to one or more descendent concepts. The system can further include classification logic operative to assist in locating documents in predetermined classes. At least one of the topic models can include synonym tables that can narrow or expand the range of synonyms associated with a term in the context of that model. The system can further include topic-based post-search processing logic responsive to the topic models and the search logic, and operative to selectively access, based on the topic models, information from result sets produced by the search logic.

In another general aspect, the invention features a search method that includes accessing digitally stored documents, accessing one or more topic models, and fingerprinting the documents accessed in the step of accessing documents based on the topic models accessed in the step of accessing topic models. The method also includes accessing one or more queries, fingerprinting the queries accessed in the step of accessing queries based on the topic models accessed in the step of accessing topic models, and detecting similarities between fingerprints produced by the step of fingerprinting documents and the step of fingerprinting queries.

In a further general aspect, the invention features a search system that includes means for accessing digitally stored documents, means for accessing one or more topic models, and means for fingerprinting documents accessed by the step means for accessing documents based on the topic models accessed by the means for accessing topic models. The system also includes means for accessing one or more queries, means for fingerprinting the queries accessed by the means for accessing queries based on the topic models accessed by the means for accessing topic models, and means for detecting similarities between fingerprints produced by the means for fingerprinting documents and the means for fingerprinting queries.

In another general aspect, the invention features a search system that includes a document interface operative to access a plurality of digitally stored documents, a query input operative to receive a search query, and a topic model interface operative to access one or more digitally stored topic models. A search engine is responsive to the query input and to the document interface, and is operative to search for documents relevant to the search query, and a search result output is operative to present an inferred pertinent topic list responsive to the digitally stored topic models.

In preferred embodiments, the search result output can be further operative to present a result list responsive to the search engine and to present search results for the search query. The search result output can further include background information display elements associated with each member of the inferred topic list. The background display elements can include an area responsive to dedicated chemical structure display logic. The system can be operative to display a selected one of the background information display elements in a pop-up or designated area in response to user selection. The system can be operative to display the selected one of the background information display elements in the pop-up or designated area in response to detection of mouse presence in proximity to an entry in the first inferred topic list that corresponds to the selected one of the background display elements. The system can further include a second inferred topic list operative to present a second set of different topic entries for the search query, with the first set of entries and the second set of entries corresponding to different topics or different segments of a collection of the documents. The topic models can be optimized for health care documents, with the first list corresponding to a drug category and including drug entries, and with the second list corresponding to a disease category and including disease entries. The search result output can be further operative to present an overview presentation area that includes a topical overview relevant to the search query. The search result output can be operative to show documents, snippets of documents, and/or selected concepts from the documents in the lists. The search result output can be operative to present the list formatted as a collapsible hyperlinked list. The search result output can be operative to present a pertinent topic list that includes classification codes.

In a further general aspect, the invention features a search method that includes accessing digitally stored documents, accessing one or more queries, accessing one or more topic models, and deriving a topic summary for the queries accessed in the step of accessing queries based on an application of the topic models accessed in the step of accessing topic models to the documents accessed in the step of accessing documents.

In another general aspect, the invention features a search method that includes means for accessing digitally stored documents, means for accessing one or more queries, means for accessing one or more topic models, and means for deriving a topic summary for the queries accessed by the means for accessing queries based on an application of the topic models accessed by the means for accessing topic models to the documents accessed by the means for accessing documents. The method can further include the step of presenting the topic summary to the user in the form of a list of topics.

In a further general aspect, the invention features a search system that includes a document interface operative to access a plurality of digitally stored documents, a document fingerprinter. The document fingerprinter includes concept identification logic responsive to the document interface and operative to identify concepts in the documents, a hierarchical concept model interface operative to identify ancestor-descendent relationships between concepts in the documents, and a document fingerprint output interface responsive to the concept identification logic and to the hierarchical concept model interface and operative to provide fingerprints for each of the documents that identify concepts and concept relationships for that document.

In another general aspect, the invention features a search method that includes accessing digitally stored documents, accessing a hierarchical concept model, identifying concepts in the digitally stored documents accessed in the step of accessing digitally stored documents and belonging to the hierarchical concept model accessed in the step of accessing a hierarchal concept model, and deriving fingerprints based on the step of identifying concepts that identifies concepts and concept relationships for that document based on the hierarchical model.

In a further general aspect, the invention features a search system that includes a source of document fingerprints, augmentation and analysis logic operative to analyze and augment the document fingerprints received from the source of document fingerprints, and an indexer responsive to the analysis and augmentation logic operative to index the augmented document fingerprints.

In another general aspect, the invention features a search method that includes accessing document fingerprints, augmenting the document fingerprints accessed in the step of accessing the fingerprints, and indexing augmented fingerprints augmented in the step of augmenting.

BRIEF DESCRIPTION OF THE DRAWINGS

FIG. 7 is a diagram illustrating a meta-analysis content panel such as can be shown by the system of FIG. 1;

FIG. 12 shows the list of FIG. 11 after drill-down operations;

FIG. 13 is a diagram illustrating a list of documents that can be presented in response to actuation of a list item in the list of FIG. 11;

FIG. 16 is a diagram illustrating a synonym table for the system of FIG. 1;

FIG. 19 is a diagram showing a chemical structure panel for norepinephrine, such as can be shown by the system of FIG. 1:

FIG. 20 is an illustrative search result page for the system of FIG. 1, reformatted to employ a larger text size;

DETAILED DESCRIPTION OF AN ILLUSTRATIVE EMBODIMENT

Figure 1:
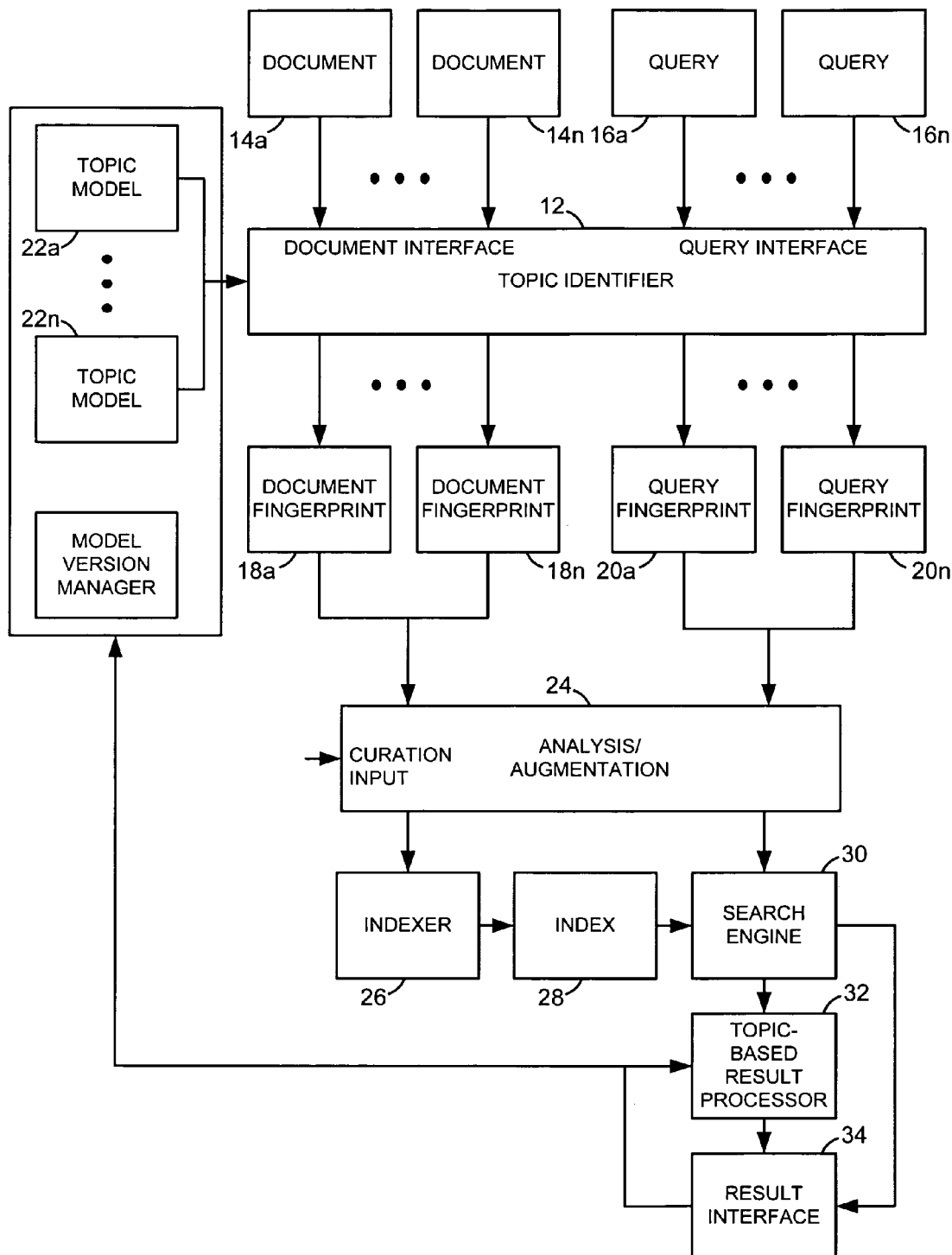
FIG. 1 is a block diagram of an illustrative embodiment of a document searching system according to the invention.

Referring to FIG. 1, an illustrative embodiment of a search system incorporating features according different aspects of the invention can include a topic identifier 12 with a document interface and a query interface. The document interface can be used to access documents 14 . . . 14n, and the query interface can be used to access queries 16 . . . 16n. The topic identifier also has an output interface for document fingerprints 18 . . . 18n and query fingerprints 20 . . . 20n, as well as a topic model interface for accessing stored topic models 22 . . . 22n. The topic identifier preferably operates in the same manner on documents and queries to yield fingerprints of the same format.

The system also includes an augmentation and analysis module 24. This module preferably receives query fingerprints from the topic identifier, although it can also operate on document fingerprints. The analysis and augmentation module can also include an interface for curation input.

The system includes an indexer 26 with an input that can receive document fingerprints, which may or may not have been the subject of analysis and augmentation. The indexer can produce an index 28, such as an inverted search index optimized to be searched by a search engine 30. The search engine can be an off-the-shelf search engine that receives query fingerprints, which may or may not have been subject to augmentation, and finds similar document fingerprints.

The search engine can provide its output to a topic-based result processor 32 and a result interface 34. The topic-based result processor can access the topic models and also provide its output to the result interface. In this embodiment, results from the search engine and the topic-based result processor can be displayed on a same results page (see FIG. 20). In some applications of the search system embodied in the illustrative embodiment, the user can also provide feedback about search results that can be used by the system or its curators.

In one embodiment, the system is implemented using software running on one or more Windows®-based computers and the user interface uses a standard web browser. Other structures and platforms can of course be used to implement systems according to the invention, including various combinations of dedicated hardware and special-purpose software running on general-purpose hardware. In addition, the various elements and steps described can be reorganized, divided, and combined in different ways without departing from the scope and spirit of the invention. It should also be noted that not all of the items presented in the discussion of the illustrative embodiment will be required for all implementations of the invention.

Figure 2:
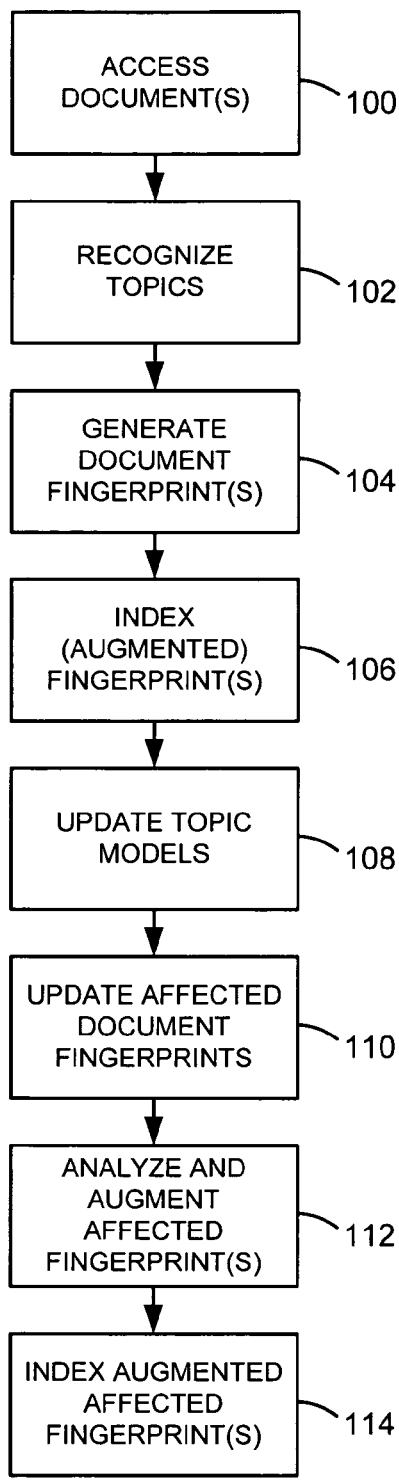
FIG. 2 is a flowchart illustrating back-end operation of the embodiment of FIG. 1.

Referring to FIG. 2, illustrative back-end operations for the search system will now be outlined generally. The identifier first accesses documents to be indexed (step 100). These can be digitally stored documents of a wide variety of types, such as web pages, text files, structured and unstructured data repositories, emails, xml, presentations, news feeds, and publications, in English or foreign languages. They can be accessed in a variety of ways such as from local storage, or from public, private, or vendor sites available through any suitable channel.

The identifier then recognizes topics in the documents based on one or more of the stored topic models (step 102). The set of recognized topics for each document are then expressed as a document fingerprint (step 104). The document fingerprints generated by the identifier can then be indexed by the indexer (step 106).

Periodically, the topic models may need to be updated (step 108). This can happen, for example, when two genes that were believed to be different are proven to be the same. These updates then usually need to be propagated into the index. The system preferably does this by maintaining a history, which enables it to only update and re-index fingerprints for documents that are affected by the changes to the topic model (see steps 110-114).

Figure 3:
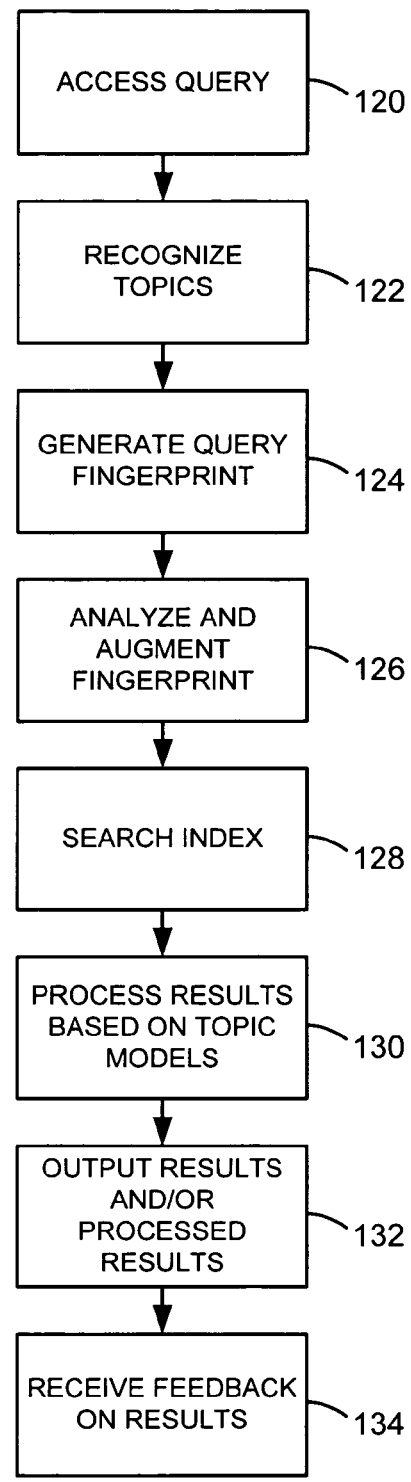
FIG. 3 is a flowchart illustrating front-end operation of the embodiment of FIG. 1.

Referring to FIG. 3, illustrative front-end operations for the search system will now be outlined generally. The topic identifier first accesses a query to be searched in the index (step 120). This query can take the form of a naturally posed free-form textual passage, and can be indexed in the same way as are the documents. Traditional Boolean query capabilities are preferably also provided.

The topic identifier can recognize topics (step 122) and generate the query fingerprint (step 124) in much the same way as it does the document fingerprints. The query can then be analyzed and augmented (step 126), such as to handle topic restriction, and topic expansion. The search engine then uses the augmented query fingerprint to search the index for documents that match it (step 128). Results of the search can be displayed in a simple list format.

The topic-based result processor can also apply various types of operations to the results (step 130). This process can first apply a relevancy test to define a limited subset of the documents. In this embodiment, the relevancy test can be a statistical test.

The system can output raw results and/or processed results, such as to a web browser based interface (step 132). Users can then interact with the results in a variety of ways that will be discussed in more detail below. They can also provide feedback to the system on their satisfaction with the results. This feedback can be received and used by the system or its curators to refine the search or to improve further searches (step 134).

Where the system uses more than one model, the fingerprint index contains information resulting from different approaches to recognizing information in a document. It may even be possible to have two different types of models for a same subject area. Where a chemistry topic model and a person topic model are used together, for example, the index can allow for matches that are based both on an advanced understanding of chemistry as well as an advanced understanding of how people are related within organizations. This can reduce the chance that a highly relevant document is missed by approaching the documents in different ways.

Various aspects of the invention that can be used in connection with systems such as the one shown in FIG. 1 will now be discussed in more detail.

Search

Figure 4:
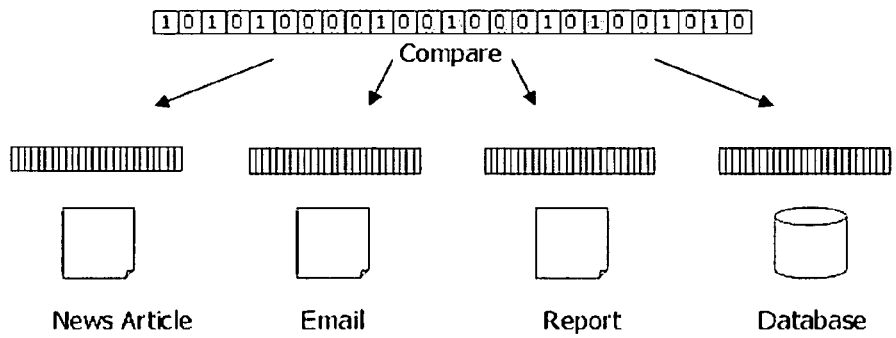
FIG. 4 is a diagram illustrating searching by fingerprint.

Referring to FIG. 4, in one aspect, the invention includes a method that employs domain-specific knowledge models to extract relevant topics (names, terms, concepts, ideas, and entities) into characteristic 'fingerprints' that may be used to powerfully and accurately search for, filter, organize, analyze and understand large collections of documents. The invention can also provide an alternative mechanism which supplies relevant documents in response to complex questions without requiring Boolean input. Instead of a Boolean query, the user may submit a larger, naturally posed, body of text such as a question, sentence or paragraph. The invention can compute a digital fingerprint for the submitted query, analyzes this query fingerprint and potentially modifies it, then compares the modified query fingerprint to pre-computed document fingerprints in the collection. The result of this search is a hit list that is ordered by a similarity score, computed for each document by comparing the query fingerprint with the document fingerprint. The documents whose fingerprints are most similar to the fingerprint of the submitted text are listed first, and dissimilar documents are listed last. The size of the hit list can be limited by statistically eliminating documents that fall below a similarity threshold, or by specifying a maximum size for the hit list.

Because the fingerprints are composed of conceptual topics rather than raw words, the fingerprint can be an accurate and canonical representation of the meaning of the document from which it was extracted.

Alerts

Some systems utilize an active 'push' model, in which documents are continuously sent to the user. A major problem with push systems can be that the information sent to the user is not sufficiently relevant to their interests. The user is therefore often forced to spend an excessive amount of time discarding useless material. And the cost incurred to discard unwanted material frequently outweighs the intended benefit.

The various aspects of the invention described here can be used to implement an improved 'push' system. Naturally posed user input text can be processed into an alert fingerprint. This alert fingerprint is then stored by a server program and used as a syndication filter. As the server program is continuously fed with new documents, these documents are fingerprinted and compared to each alert fingerprint. Whenever a document fingerprint is sufficiently similar to an alert fingerprint, the document is added to a queue for delivery to the appropriate user. Matching document summaries may then be delivered in the user's preferred format, such as email, text messages, or RSS (Really Simple Syndication, Rich Site Summary, or RDF Site Summary). The user may then view the entire document through links or attachments made available by the system. As the user reads these new documents, they may provide feedback to the system that keeps their alert fingerprint(s) updated so that future content delivered by the system remains highly relevant to the user's interests.

Automatic Content Organization

Search is a valuable technique for finding answers to specific questions. But if a user needs to understand the range and depth of information available in the system about a topic or idea, the results retrieved by search systems can be too detailed. A document summary system responds to a query with an organized catalog of groups of documents. Documents are grouped according to the topics that they share in common, and the number of documents within each group is displayed to the user. Selecting a document group re-organizes the content around the topics that define that group, and the system returns a new catalog of refined groups.

Some topics are naturally hierarchical, such as classifications of diseases, genes, treatments, geography, and equipment. The content organization system uses these natural hierarchies to summarize information and enable users to 'zoom in' to more detailed topics and 'zoom out' to more general ones.

Features and Benefits

It is an object of the system of the illustrative embodiment to improve active search, passive filtering, and organization of a document collection. To this end, the system can attempt to gain the greatest possible understanding of the content of each document by converting the raw text, symbols, attachments, and meta-tags present in the document into canonical topic identifiers. Each topic identifier represents a body of information known about a particular topic. This body of information may include the definition of the topic, synonyms of the topic, generalizations of the topic ('parents'), specializations of the topic ('children'), and properties of the topic such as the chemical structure of a small molecule drug, the longitude and latitude of a geographic location, the institutional affiliation of a human author, etc.

Figure 5:
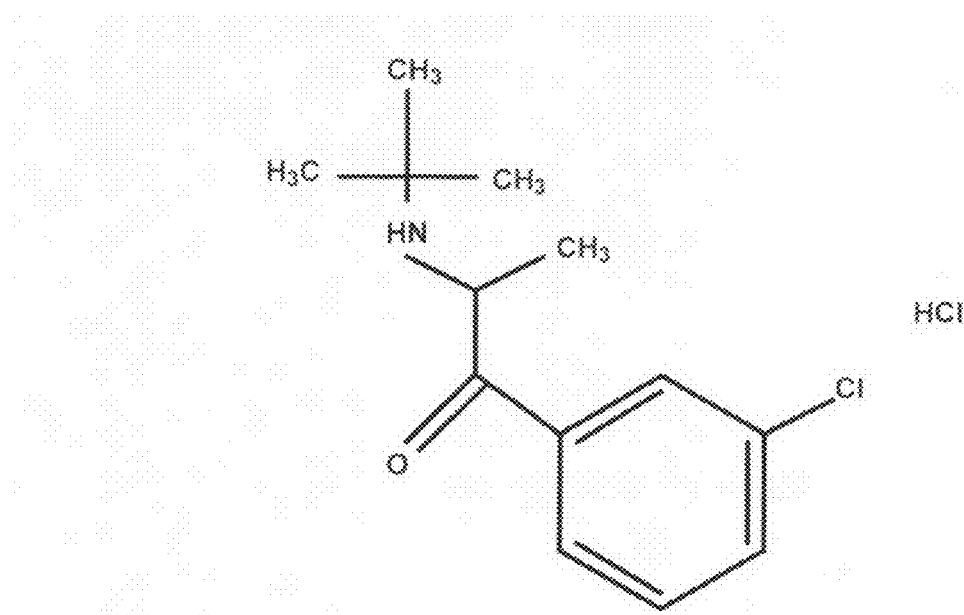
FIG. 5 is a diagram showing the chemical structure of bupropion.

The system can gains many advantages from converting the raw content of an input document into a canonicalized topic-based representation. A first of these is reduced false negatives. Systems that do not have any understanding of synonyms often provide false negatives in their search results, because they require the user to input synonymous search terms. For example, 'wellbutrin' is GlaxoSmithKline's trade name for a drug that has been assigned the official INN name 'bupropion' (FIG. 5). During its development, bupropion was also known by the company-assigned identifier 'BW 323U66'. The chemical structure of bupropion is uniquely and completely described by the text string CC(C(=O)clcccc (cl)Cl)NC(C)(C)C.Cl, its 'isomeric SMILES'. 'wellbutrin', 'bupropion', and 'BW 323U66' and its isomeric SMILES are exactly the same thing; they are the same molecule. If a user searches for 'wellbutrin', a system without a synonym model will miss documents that refer only to 'bupropion', 'BW 323U66', or the SMILES string.

A topic-based system recognizes that the synonyms above (and others) all refer to the same chemical compound. When a document or user input is processed into a fingerprint, occurrences of any synonym are replaced with the canonical topic identifier, ensuring that all operations performed by the system are agnostic of the original terminology used in the source document.

Systems according to the invention can also provide more accurate frequency statistics. Some systems accept the search term 'wellbutrin' and expand this into the Boolean search "wellbutrin OR bupropion OR BW 323U66". However, if the underlying search index is word-based and not topic-based, then the search relevancy can be sub-optimal. The reason for this is that text-based search index systems generally use statistics about the frequency of occurrence of words to rank the search results. If a drug is referred to 49% of the time as 'wellbutrin', 49% of the time as 'bupropion', and 2% of the time as 'BW 323U66', then the search index will incorrectly assign a high score to documents using the term 'BW 323U66' because it thinks that these documents are discussing a less common idea and thus warrant a better score. But all these terms should be scored equally for any document in which they occur, because they are referring to exactly the same topic.

In the embodiment described here, a unique identifier is assigned to this drug and it is this identifier that is used to compute the search-scoring statistics. Topic-based statistics accurately reflect the true frequency of occurrence of each topic.

Systems according to the invention can also exhibit improved relevance by searching for related topics. Users may often desire to search for an idea that represents a general category, and expect the search system to retrieve documents about specializations of that category. For instance, 'statins' are a class of chemical compounds that lower cholesterol synthesis. Some specific statins are simvastatin (Zocor), pravastatin (Pravachol), atorvastatin (Lipitor).

With word-based search systems, there can again be a false negative problem. A document that mentions atorvastatin (or Lipitor), but does not use the word 'statin', will not be found by a word-based search system. The solution is to identify the meaning of the word 'statin', and then expand the search to include the specific statin drugs as well as the general 'statin' concept. The resulting search will find documents about statins in general or about specific statin drugs.

This expansion may be performed in several ways, depending on the nature of the topic. Topics that are organized into hierarchies can be expanded by including other topics based on their relationships within the hierarchy, such as concrete child concepts of an abstract concept.

Some topics, such chemicals and geographic locations, have a canonical and unambiguous meaning and support similarity operations. For example, the similarity of two sequence-based entities such as chemicals or proteins may be evaluated using the Tanimoto similarity metric. The similarity of two geographic locations may be compared by computing the physical distance between them.

Whether the topic expansion is based on pre-organized hierarchies or on a computational procedure, expanding generic topics to include related topics or specializations can help to deliver the search results that users are expecting.

Systems according to the invention can also benefit from document organization features. In their quest to answer a specific question, it is often useful to users to understand the 'landscape' of a large number of documents. Rather than wading through a long list of hits, these users are presented with a manageable number (10 to 20) of categories, or bins, along with the number of documents that 'belong' to each bin. Indexing by topic provides the system with a rapid way to summarize a set of search hits into bins, to display the bins in a hierarchical fashion, and to enable the user to explore bins by examining the sub-bins within them or the collection of documents that belong to a bin.

Figure 6:
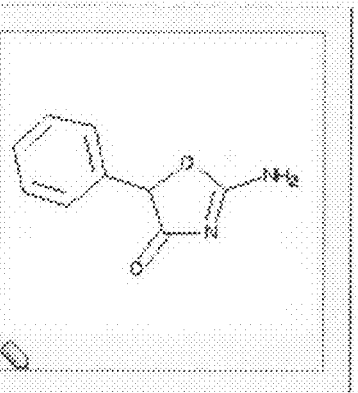
FIG. 6 is a diagram illustrating an explanatory material panel such as can be shown by the system of FIG. 1.

Referring to FIG. 6, systems according to the invention can also benefit from user education features. Documents returned by a search often contain concepts or ideas that are unfamiliar to the user. Systems according to the invention can associate topics with the words in the document, and topics are associated with properties such as definitions and other collateral such as diagrams and images. When the user encounters an unfamiliar topic, therefore, the system can immediately provide explanatory material that educates the user about the topic in question.

Referring to FIG. 7, systems according to the invention can also benefit from hierarchical structured meta-descriptors. Documents are created with different intentions for different audiences. Each class of document is useful for answering particular types of user questions, and not useful for others. This invention uses topics that describe document classes to choose the right set of content for a particular question.

For example, consider the question 'Wellbutrin is used for smoking cessation. What other antidepressants have indications in stopping smoking and other drug abuse syndromes?' This question can be answered very effectively through the following process:

1. Gather the medical evidence that can be best used to answer this question
   a. Select peer-reviewed research papers
   b. Prefer Meta-Analysis papers by selecting the Meta-Analysis topic
2. Use the fingerprint-based search technique to find all Meta-Analysis documents in the medical evidence that are relevant to the user's question
3. Show the relevant content from each hit document to the user A meta-analysis document is a document that combines the results of several studies that address a set of related research hypotheses.

Systems according to the invention can also benefit from focused snippets. When multiple documents are relevant to a user's question, it is not feasible to show the entire contents of all these documents on a computer screen. It can therefore be valuable to be able to show the most relevant phrases, or 'snippets', from each hit document. In different situations, different snippets of the document may provide the most useful information to the user. Systems according to the invention can use its understanding of topics to provide the snippets from each document that best answer the user's question.

One important aspect of drug treatment is the issue of adverse events (cases of harmful side effects of a drug). Consider the question 'Wellbutrin is used for smoking cessation. What other antidepressants have indications in stopping smoking and other drug abuse syndromes and what adverse effects have been reported?' The best snippets to show in response to this question will be sections of the hit documents that relate to the topic of adverse events.

Topic Types—Summary

Information about topics, including a specification of how to recognize the topics present in a document, are stored in a topic model. Each topic model recognizes a particular family of topics, identified by a topic type. Important topic types are summarized below.

TABLE 1

'Concept' topic type

| | |
|---|---|
| Description | A multi-parented hierarchy of nodes which represents concepts and entities. |
| Examples | "Anti-depressant Agent", "Demyelinating Disease", "Phase I Clinical Trial" |
| Primary Sources | Ontologies such as MeSH, NCI Thesaurus, SNOMed, Gene Ontology |
| Unique Identifier | System-assigned identifier. |
| Identifying Technique | Recognition of concept synonyms, stemmed or unstemmed. Disambiguated through contextual clues. |
| Operations | Find parents, children, defined subsets, root paths |

TABLE 2

'Chemical' Topic Type

| | |
|---|---|
| Description | A specific chemical entity |
| Examples | "bupropion", "1,2 dibromoethane", "algestone acetophenide" |
| Primary Sources | Lists of known drugs and experimental compounds. Automated parsing of IUPAC names and structure objects (e.g. ChemDraw). |
| Unique Identifier | Normalized (e.g. salt-stripped) isomeric SMILES |
| Identifying Technique | Recognition of drug names (unstemmed), IUPAC names, embedded SMILES and structure objects, and registration numbers such as CAS |
| Operations | Chemical search operations such as exact, superstructure, substructure, and similarity searching<br>Derived chemical properties such as molecular weight, number of rotatable bonds, number of Lipinski Rule of 5 violations, polar surface area |

TABLE 3

'Gene' Topic Type

| | |
|---|---|
| Description | Nucleotide sequence |
| Examples | Bcl-xL gene, Src oncogene |
| Primary Sources | Genes and proteins in structured ontologies such as the NCI Thesaurus Gene registries such as GenBank<br>Protein registries such as SwissProt |
| Unique Identifier | Sequence |
| Identifying Technique | Recognition of gene and protein names (unstemmed)<br>Recognition and interpretation of nucleotide and amino acid sequences, e.g. in FASTA file format |
| Operations | Find sequences that match a subsequence<br>BLAST for sequence matches |

TABLE 4

'Location' Topic Type

| | |
|---|---|
| Description | A geographic location |
| Examples | "26 rue d'Ulm, 75248 Paris cedex 05, France", "Imperial College London, London, SW7 2AZ, UK" |
| Primary Sources | Structured address information in documents<br>Free text converted to structured addresses by geocoding algorithms |
| Unique Identifier | Coordinates in 3-D space such as (longitude, latitude, altitude) |
| Identifying Technique | Conversion of address information such as city, county, state, zip code, country to 3-D coordinates. Source material may be structured data such as the Oasis eXtensible Address Language, or free text recognized by a geocoding algorithm. |
| Operations | Compute the distance between two locations<br>Find all locations within a specified distance of a point of origin |

TABLE 5

'Person' Topic Type

| | |
|---|---|
| Description | An individual |
| Examples | "R. T. Ross, Department of Medicine, University of Manitoba, and The Health Sciences Centre, Winnipeg, Canada" |
| Primary Sources | Structured name information in documents<br>Free text converted to structured names by name parsing algorithms |
| Unique Identifier | System-assigned identifier |
| Identifying Technique | Fuzzy matching by full name, title, professional degrees, institutional affiliation. Disambiguated by manual curation. |
| Operations | Find documents for an author<br>Determine experts in a subject area by looking at document authorship |

Recognition—Implementation

The primary function of each topic model is to recognize the topics found in a source document. To this end, a recognize function accepts a TextField as input, a data structure which combines the document characters with meta-information such as the content type (plain text, HTML, XML, tab-delimited, PDF, etc). The output of this function is a list of topic identifiers, along with the locations in the document where the recognized topics begin and end.

Relationships

Topics within a model are related in some way. While the nature of these relationships varies, each topic model provides a domain-specific way to find and explore related topics. For example, two concepts may share a common ancestor, two chemicals may have similar structures, two genes may have similar sequences, two locations may be nearby in space, and two people may share the same interests and colleagues.

Topic-Based Indexing

Figure 8:
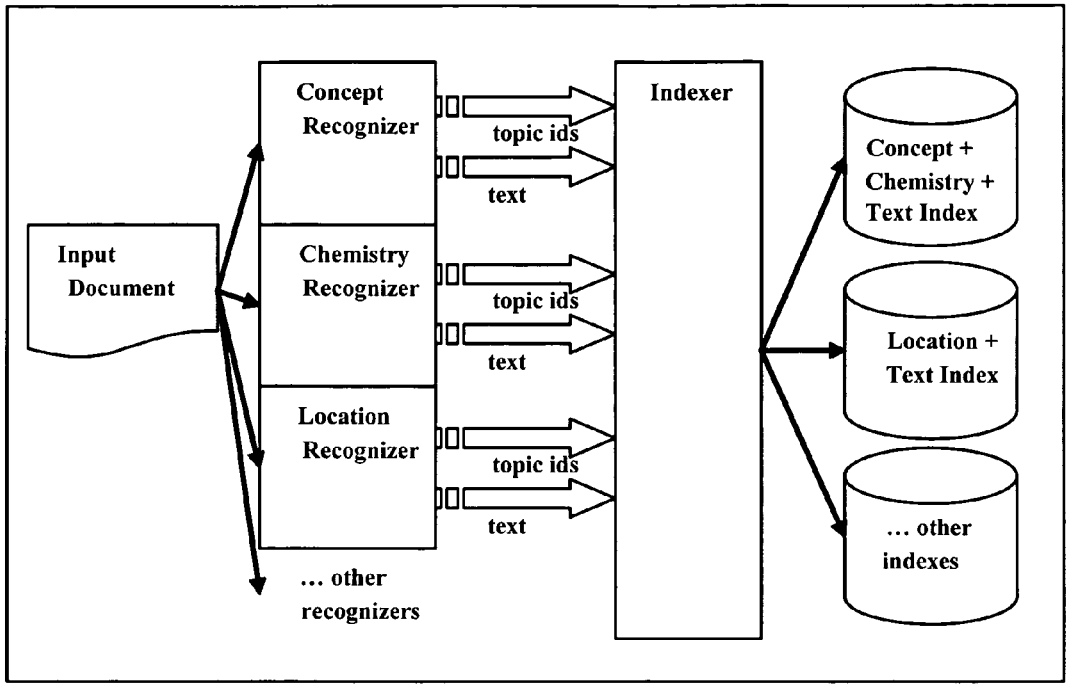
FIG. 8 is a flow diagram illustrating the document indexing process for the system of FIG. 1.

Referring to FIG. 8, systems according to the invention can use topic models to build and maintain integrated, topic-based indices from a set of documents. When a document is received by the system, it is processed by the recognizer component of each topic model. The output of each recognizer component is the topic identifiers for topics that were recognized by the model in the document (the 'fingerprint'), as well as the complete analyzed text of the document.

An indexer component accepts these streams of topic identifiers and text and writes them into indexes. Each index stores topic identifiers from one or more topic models, as well as the analyzed text from the source document. The system is flexible in regards to which topics are written into which index. An index may contain only one topic type, or multiple topic types, and a particular topic type may be written into multiple indexes. Indexes that combine multiple topic types can efficiently respond to queries that include multiple topic types, such as a question that combines medical terminology with location: 'Are there any smoking cessation clinical trials in Boston Mass. that are recruiting patients?'.

Each index can be implemented using a standard full-text search engine, such as Lucene from the Apache Software Foundation. The processed document information is written into the full-text index with the following fields:

Field Name Description

DOC_ID System identifier of the source document

SOURCE_DATE Date on which the document was created or modified

SOURCE_YEAR Year on which the document was created or modified

SOURCE_VERSION Version number of the source document

[TOPIC]_MODEL_VERSION Version of the topic model that was used by the recognizer TAG_TOPIC_IDS Topic identifiers for meta-tags that are applied to the document. A meta-tag is an annotation that describes the document, it is often provided separately from the text of the document itself.

TEXT Analyzed text of the source document

The TOPIC_IDS of a document (its fingerprint) should be efficiently made accessible by the full-text engine.

The [TOPIC]_MODEL_VERSION field is repeated for each topic model that is present in the index. So if an index includes concepts and locations, it would have fields named CONCEPT_MODEL_VERSION, LOCATION_MODEL_VERSION, and TOPIC_IDS.

Indexing a new document is only half of the story. The indexer must also be able to respond to changes in the topic models and update the indexes appropriately. One possible approach would be to periodically re-index all the documents in the collection, but a more efficient and responsive implementation is described here.

Each topic model maintains a version number. Each time the topic model is changed, the version number is incremented. Clients such as the indexer can use the recognizer's version number to detect when changes have occurred in the topic model. The recognizer provides two functions that the indexer can use to respond to topic model changes: GetChangedTopics and GetAddedTopics.

GetChangedTopics identifies topics which have been changed between two revisions of the topic model. The indexer responds by finding all documents in the index whose [TOPIC]_MODEL_VERSION is earlier than the latest model version, and whose TOPIC_IDS or TAG_TOPIC_IDS field contains one of the changed topics. Each of these documents is reindexed.

GetAddedTopics identifies topics which have been added between two revisions of the topic model. The indexer then asks the topic model for all terms (words, phrases, symbols, etc) whose presence may indicate that one of the added topics is present in a document. For example, if the new synonym 'Wellbutrin XL' is added for the chemical concept 'bupropion', the indexer will find all documents that contain 'Wellbutrin' and 'XL' adjacent to each other. The indexer then responds by finding all documents in the index whose [TOPIC]_MODEL_VERSION is earlier than the latest model version, and whose TEXT field contains the new terms. Each of these documents is reindexed.

Topic-Based Searching

The topic-based index is used to perform searches, and to rapidly provide information about the topic composition of the documents.

Figure 9:
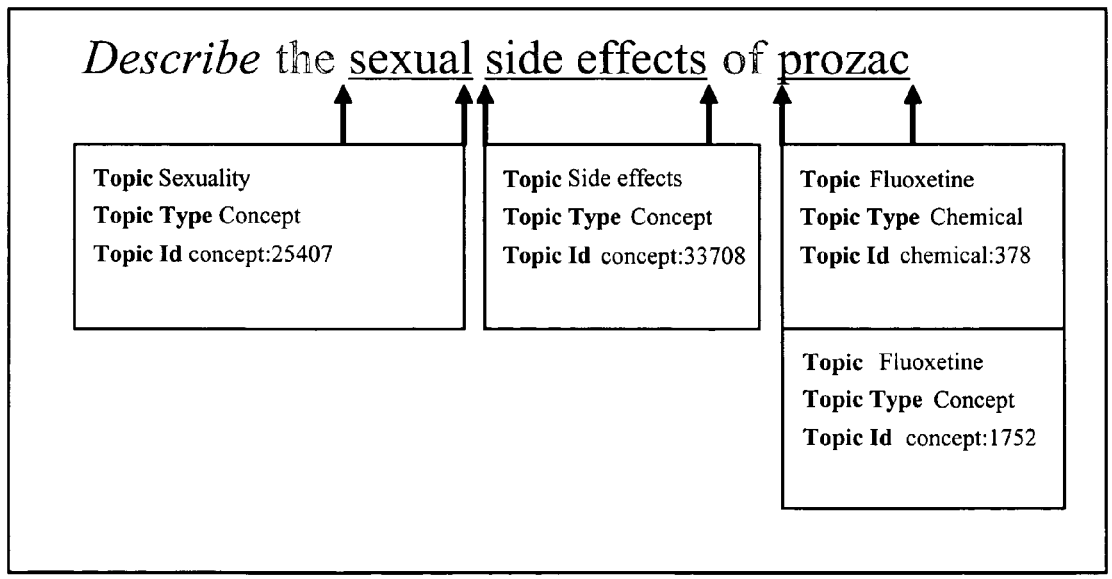
FIG. 9 is a diagram illustrating a fingerprinted query that can be used by the system of FIG. 1.

Referring to FIG. 9, the search process begins by applying the topic recognizers to the user's query. The result is a fingerprint that identifies all the topics in the query. Common words (known as 'stop words' in the search technology field) are usually removed; in this case, 'the' and 'of' are treated as stop words. In addition to recognized topics, the search also includes any non-recognized words that are not stop words; in this case the word 'Describe'.

The search may then be augmented in a variety of ways.

Search Augmentation

Precedence

Some words or phrases may be recognized as more than one topic. In this embodiment, for example, the word 'prozac' is recognized by the concept recognizer and by the chemical recognizer. As discussed later in the chemistry recognition section, the chemistry recognizer is a non-stemming recognizer so the chemical topic is a stronger match than the concept topic. To avoid double-counting 'prozac' when the search is executed, therefore, the topic concept: 1752 is removed from the query fingerprint.

Topic Expansion

In some cases, a user may enter a term that identifies a general class of topics or entities. When this occurs, systems according to the invention can use the relationship-determining features of the topic models to uncover useful, but hidden information. When a user query is recognized and the relevant topics are discovered, it can be augmented with related topics. When these related topics are included in the query, information that is relevant to the user's query but not directly specified by the contents of that query can be presented to the user. In this way the results of the query can provide novel and non-obvious information without the user having to understand or enumerate explicitly the related topics.

For example, 'SSRI' is an acronym for Selective Serotonin Reuptake Inhibitors, a class of antidepressant drugs that includes fluoxetine (Prozac). The concept model recognizes the 'SSRI' concept and it knows which specific drugs belong to the SSRI family. The user's search (query fingerprint) can be augmented to include the specific SSRI drugs as well as the 'SSRI' topic. By expanding the SSRI topic in this way, the search will find documents that discuss SSRI drugs such as fluoxetine, even if the document does not explicitly mention the SSRI topic.

Restriction

The system may have knowledge of the user's intent that allows it to focus the search onto specific slices of the document collection. For example, a physician who is trying to make a diagnosis may only be interested in documents that are annotated with the differential diagnosis topic. A differential diagnosis restriction may be added to the user's fingerprinted query to limit the search results.

Timeliness

Users often consider more recent information to be more relevant. Many types of documents, including scientific publications, drug labels, patents, and clinical trials, have date information that should be taken into account during a search. However, this date information should be considered in a 'soft' manner similar to the topics in the fingerprint. Older documents and documents without date information should not be rejected entirely, just as new documents should not be listed at the top of the hit list regardless of their relevance to the user's query. The search system preferably implements the user's preference for timely information by boosting the relevance of recent documents.

Search Execution

Once the search is in its final form, it is ready for execution against the index. Consider the sample query described above 'Describe the sexual side effects of prozac', restricted to meta-analysis studies. After the precedence, topic expansion, restriction, and timeliness operations are performed, the system represents the query as a Boolean full-text query. The following example uses the query syntax for the Lucene full-text engine:

Hit Selection

A query such as the one presented in Table 6 will return any document that contains a TEXT or TOPIC_IDS value listed in the first query clause (the 'fingerprint' clause). Clearly, a document that matches only 1 term from a list of 4 is not a good match. Queries often contain 10, 20, or many more terms, so the set of documents that contains at least one of these terms is very long. Users only want to see documents that are highly relevant to their question, so the system should return only those documents that score well against the query.

Scoring 'well' is a subjective notion, and there are several ways that it can be implemented. The approach taken by this invention is to use statistical tests on the hit list to determine which documents score above a relevance threshold. This process occurs in two phases. In the first phase, a minimum number of matching terms from the fingerprint clause is used to eliminate many poor matches. Then, system computes the mean and standard deviation of the scores of the remaining documents. A threshold score is calculated by adding a multiple of the standard deviation to the mean. Documents whose score is at or above this threshold are returned to the user.

Topic-Based Summarization

A search often returns hundreds or thousands of hits. A topic-based summarization can help the user to gain a high-level understanding of the nature of the hit list, facilitate the exploration of the hit list, and find a small set of documents that provide a highly relevant answer to the question.

The summarization process begins with three pieces of information: a list of documents (the hit list), the list of topics that are identified for each document (the document fingerprints), and a hierarchical organization of the topics in a particular topic model. From these facts, the system attempts to determine a small set of topics that best summarize the hit list.

Figure 10:
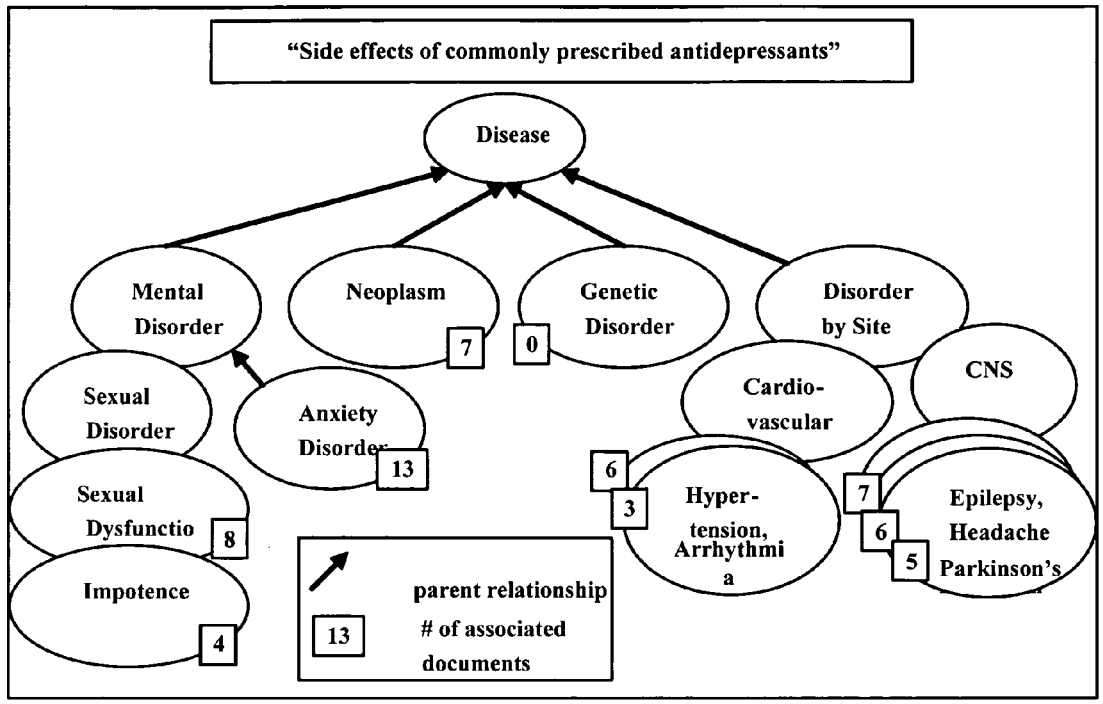
FIG. 10 is a diagram that outlines summarization input for an example search for the side effects of commonly prescribed antidepressants.
Figure 11:
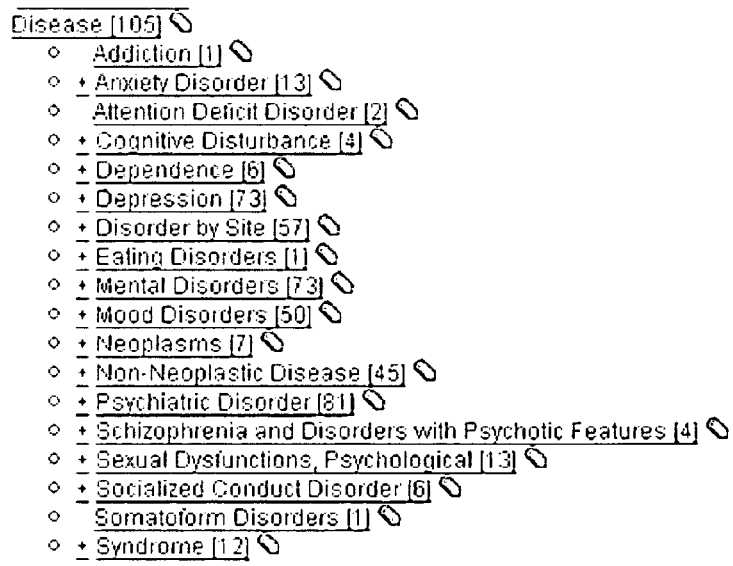
FIG. 11 is a diagram illustrating a summarization list such as can be shown by the system of FIG. 1.

The first step is to fetch all the document fingerprints, and associate documents with the topics that the documents contain. In FIG. 10, eight documents discuss 'sexual disfunc-

TABLE 6

| Boolean Expression | Explanation | Flags |
| --- | --- | --- |
| TEXT:describ OR<br>TOPIC_IDS:"concept:25407" OR<br>TOPIC_IDS:"concept:33708" OR<br>TOPIC_IDS:"chemical:378" | Hit documents contain at least one of the TEXT and TOPIC_IDS field values. This query clause is the 'fingerprint' clause. | Required |
| (TAG_TOPIC_IDS:"concept:3772")^0.0 | The document must have the Meta-Analysis tag. The Meta-Analysis tag has the topic identifier "concept:3372". This clause does not affect the overall score of the document. | Required |
| (SOURCE_YEAR:2006^1.0<br>OR SOURCE_YEAR:2005^0.9<br>OR SOURCE_YEAR:2004^0.8<br>OR SOURCE_YEAR:2003^0.7<br>OR SOURCE_YEAR:2002^0.6<br>OR SOURCE_YEAR:2001^0.5<br>OR SOURCE_YEAR:2000^0.4<br>OR SOURCE_YEAR:1999^0.3<br>OR SOURCE_YEAR:1998^0.2<br>OR SOURCE_YEAR:1997^0.1)^0.25 | If the SOURCE_YEAR field on a document is populated, it may boost the document's query score. This clause is may boost the score by as much as 0.25 for a document with a SOURCE_YEAR = 2006, or as little as 0.025 for a document with SOURCE_YEAR = 1997. Undated documents receive no boost, but they are not excluded from the hit list because this entire clause is optional. | Optional | tion', four documents discuss 'impotence', 13 documents discuss 'anxiety disorder', and so on. Each document generally discusses many topics so the relationship from documents to topics is one-to-many. Next, the system finds all the ancestors of topics that are discussed in any document in the hit list. There are many ways to determine this 'parent' list, but the most straightforward is to use the hierarchical relationships defined in the concept model (see FIG. 15). The set of all topics found in the fingerprints, plus all of their ancestors, forms the space over which the summarization is performed. In the example, the 'genetic disorder' concept is defined in the concept model, but no documents in the hit list refer to this concept so it is removed from consideration.

Once the topic set is constructed, the summarization process proceeds by 'rolling up' child topics into parent topics. The first step might be to combine impotence with sexual dysfunction, resulting in a total of 13 documents across the two topics (one of the documents mentions both topics). Next, hypertension and arrhythmia are rolled up into cardiovascular, and epilepsy, headache, and Parkinson's are rolled up into CNS (Central Nervous System disorders). The process of rolling child topics into parent topics continues until only a specified number of topics remain. This set of topics is then displayed to the user. An example is shown in FIG. 8 for the example search 'Side effects of commonly prescribed antidepressants". Each line lists a topic, along with the number of documents that discuss that topic or a descendent topic. Each topic line can be a hyperlink; when the user clicks on a topic line, the application shows the documents that discuss that topic or a descendent topic.

This display shows, at a glance, which diseases are mentioned in the documents fetched by the search, and how these diseases are distributed among general categories. Each category showing a plus (+) sign can be expanded to show sub-categories, as shown in FIG. 12. Here, the user is shown that there are eight documents, from the total list of 105 documents, that are relevant to the query and discuss the topic of heart diseases. Clicking on the heart diseases link shows these eight documents, and three of them can be shown in a result area (see FIG. 13).

Topic-Based Ranking

Summarization provides a top-down view of a document collection. Another very useful capability is more of a 'bottom-up' view in which the most important topics from a document collection are collected and ranked in descending priority order.

The input to the ranking process is the same as for summarization, namely the topic hierarchy with the documents from the hit list attached to the topic nodes. This process determines the most important 'leaf' or 'near-leaf' topics. A 'leaf' topic is a topic that has no descendants in the process input. A 'near-leaf' topic is a topic that has children in the process input, but is itself mentioned in a significant number of documents. Once the 'leaf' and 'near-leaf' topics are collected, they are ranked according to the number of documents that discuss the topic or any descendant topic.

Figures 14, 15:
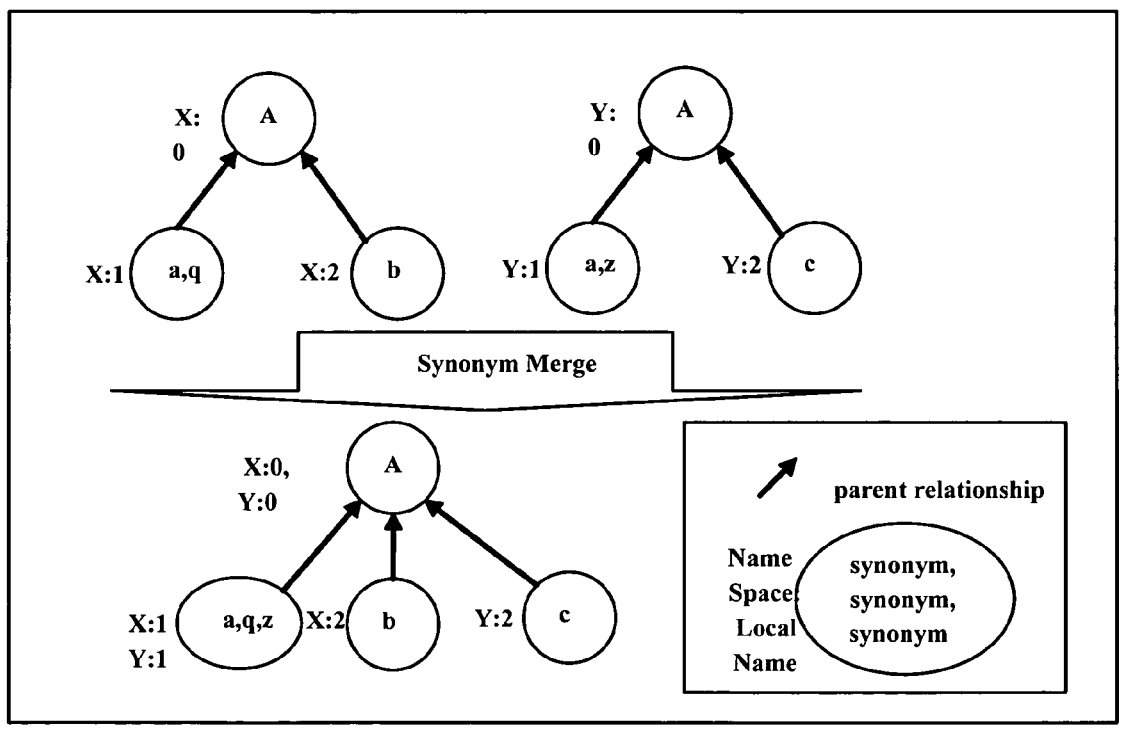
FIG. 14 is a diagram illustrating a topic-based ranking list such as can be shown by the system of FIG. 1 after drill-down operations.
FIG. 15 is a diagram illustrating synonym relationships for the system of FIG. 1.

FIG. 14 shows an example for the example search 'Side effects of commonly prescribed antidepressants". Like the summarization view, each line in the ranked view lists a topic, along with the number of documents that discuss that topic or a descendent topic, and each topic line is a hyperlink that leads to the documents that discuss that topic or a descendent topic.

Topics that expand in the ranking display are 'near-leaf' topics. Here it can be seen that the topic 'impotence' is discussed in four documents, and its parent topic 'sexual dysfunctions, psychological' is discussed in an additional seven documents. Because these documents are discussing topics that are so closely related, they are ranked together.

The ranked list in this example clearly shows many of the most important side-effects of antidepressants: sexual dysfunction, insomnia, xerostomia (dry mouth), hypertension (and drug-induced weight gain), convulsions, and headaches.

Topic Models—Detail

Concept Model

A concept can be almost any idea, including a geographic location, class of chemicals, family of diseases, course of treatment, gene, protein, animal species, human individual, or any other idea or entity. Within the concept model, concepts are organized into a multi-parented hierarchy. In addition, each concept is associated with properties such as synonyms, definitions, a preferred name, links to external resources, and relationships to other concepts in the concept model.

Data Structure

The concept model consists of subjects (Table 7), each of which has zero or more properties. Subjects may be imported from many different sources. A Namespace identifies the original source of the subject, and a LocalName contains the identifier assigned by the original source to the subject. The Namespace identifies the original source of the subject, and the LocalName is an identifier assigned by the original source to the subject.

As shown in Table 7, each property represents a value or relationship on a particular subject.

TABLE 7

| | |
|---|---|
| Subject | Identifies the subject with which this Property is associated |
| ValueText | Stores the text value of the Property, if any |
| ValueObject | Stores the subject value of the Property, if any |
| Meta | Identifies the meta-type of the Property. Meta-types include 'name', 'synonym', 'definition', 'parent', 'category', and others. |
| Priority | When multiple Properties for the same Meta are attached to the same subject, the Priority field is used to order the Properties. |
| CreatedVersion | Version number when this Property was created. |
| DeletedVersion | Version number when this Property was deleted. |

Synonym Curation

Each concept is composed by merging related subjects from within the concept model. The merging process is based on the 'synonym' properties of each subject.

This process operates by combining subjects based on synonyms. The premise is relatively simple: any subjects that have matching synonyms are combined into a single concept. For example, as shown in FIG. 15, subjects are imported from two namespaces, 'X' and 'Y'. Subject X:0 has the synonym 'A', subject X:1 has the synonyms 'a' and 'q', subject Y:1 has synonyms 'a', and 'z', and so forth. The synonym merge process combines X:1 and Y:1 into a single concept. All the properties of the source subjects are now associated with this concept, including the union of the synonyms 'a', 'q', and 'z'. In an analogous manner, X:0 and Y:0 are combined into a single concept based on the synonym 'A'.

Synonym merging can lead to some problems, which are addressed by curating the synonym lists. The most common problem occurs when two subjects that represent two distinct ideas (as determined by a human curator), are merged into a single concept based on a shared synonym. This can occur frequently with ambiguous three letter acronyms, for example. Most acronyms that are formed from three uppercase letters are used with multiple, completely different meanings. In cases like this, a human curator can use a software tool to look at the subjects and their synonyms, and delete synonyms which are improperly causing the subjects to be joined together.

Figure 16:
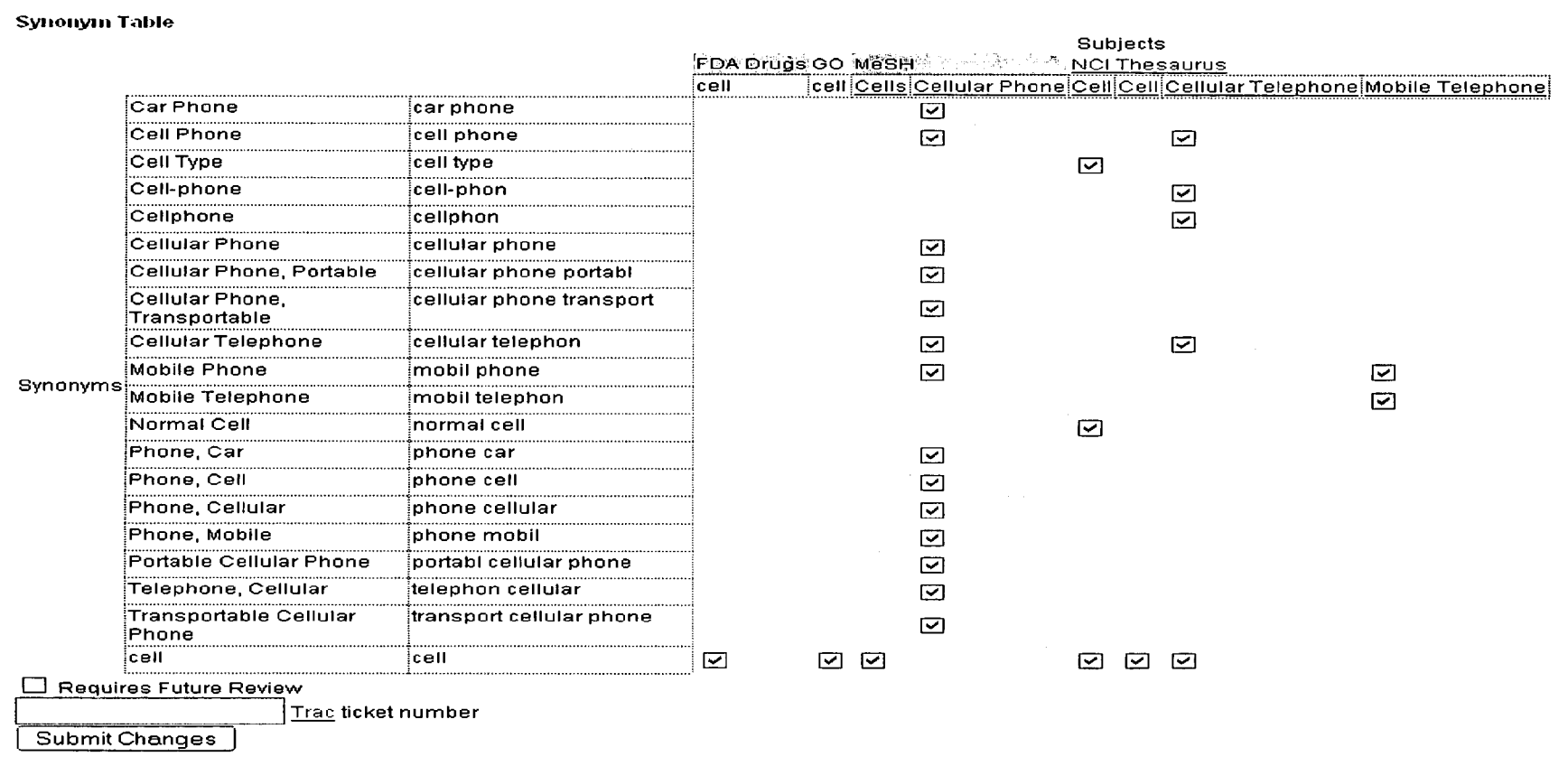

FIG. 16 shows a synonym table for the concept of a 'cell'. The subjects list across the top shows the subjects in the source ontologies 'FDA Drugs', 'GO' (Gene Ontology), 'MeSH', and 'NCI Thesaurus'. Each checkbox shows an association between a synonym (such as 'Car Phone') and a subject (such as 'MeSH:Cellular Phone'). In this case, the synonym 'cell' is associated with many of the subjects in the table, including 'FDA Drugs:cell', 'GO:cell', 'MeSH:Cells', 'NCI Thesaurus:Cell', and others. This synonym is causing two conceptual ideas, the technology concept of a cellular phone and the biological concept of a cell, to be merged together.

Figures 17, 18:
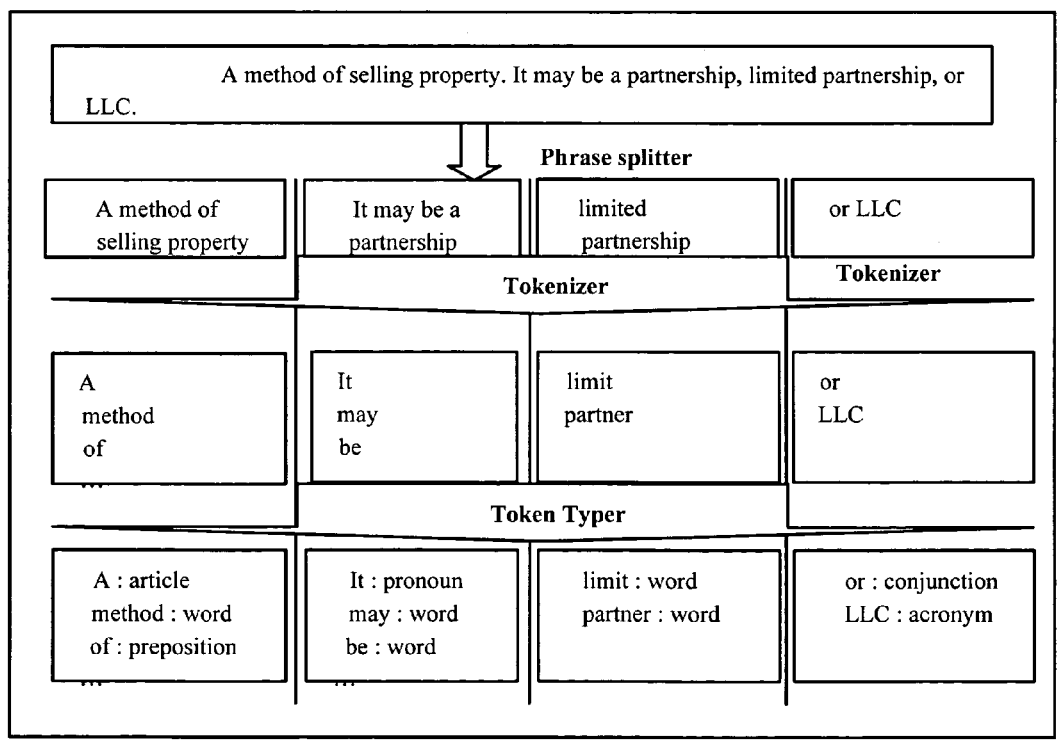
FIG. 17 is a diagram illustrating a corrected cell for the synonym table of FIG. 16.
FIG. 18 is a diagram illustrating operations of a text analyzer for the system of FIG. 1.

FIG. 17 shows a solution to the problem. By removing the synonym 'cell' from subjects which represent the cellular phone concept, a corrected concept is obtained.

Concept Recognition

The concept recognizer begins by examining the document text. The text is pre-processed by a text analyzer and then submitted to a synonym matcher.

Referring to FIG. 18, the text analyzer proceeds in three stages:

Partitioning of the body of text into phrases
  Partitioning of phrases into words (tokens) and processing of the words by algorithms such as stemming
  Assignment of token types to tokens A token type assigns a general category to a token, such as EmailAddress, Acronym, Abbreviation, Identifier, Word. Each Token contains the following information:

TABLE 8

| Text | The raw text of the word |
| Type | The TokenType assigned to the token |
| Parent | The parent token from which this token is derived. For example, the parent of a token may be a token that contains the unstemmed text of a word. The parent of that token may be the text phrase before it was split into words. |

In order to recognize multi-word concepts such as 'acquired immune deficiency syndrome', tokens are combined into multi-token groups. Each combination of consecutive tokens that does not cross a phrase boundary is matched to the synonym database. The token list may be compared to stemmed or unstemmed synonyms, depending on the decision of the curator.

In the example presented below in Table 9, the stemmed form of the drug brand name 'gardenal' is 'garden' which of course is a word in its own right. Therefore, the stemmed word 'garden' should not be matched with the drug 'gardenal'. Similarly, the unstemmed word 'gardenal' should not be matched with the cultivation concept 'garden'.

TABLE 9

| Synonym | Stemmed Synonym | Meaning |
|---------|-----------------|---------|
| gardenal | garden | A brand name for the drug 'phenobarbital' |
| garden | garden | A plot of ground where plants are cultivated |

Contextual information may also be applied to distinguish between two synonyms.

Chemistry Model

Each distinct chemical can be represented uniquely by a representation such as a SMILES or InChI string. Industry standard cheminformatics processes may be used to normalize a chemical, by performing operations such as salt-stripping, into a canonical sequence of characters (text string) that uniquely identifies the chemical or a small family of nearly identical chemicals. But this canonical text string is rarely used in documents to refer to the chemical. A variety of official and unofficial names are used instead. The salt-stripped canonical SMILES string CC(C(=O)c1cccc(cl)Cl)NC(C)(C)C represents a chemical that is referred to by a variety of names including the sample chemical names listed in Table 10:

TABLE 10

| bupropion, bupropion hcl | INN name |
| wellbutrin, wellbutrin sr, wellbutrin xl | Brand name (anti-depressant) |
| zyban | Brand name (smoking cessation) |
| 1-(3-chlorophenyl)-2-tert-butylamino-propan-1-one | IUPAC name |
| InChI=1/C13H18ClNO/c1-9(15-13(2,3)4)12(16)10-6-5-7-11(14)8-10/h5-9,15H,1-4H3 | InChI name |
| 34841-39-9 | CAS registry number |

In the embodiment presented, the chemistry model captures and stores the canonical structure of all chemicals that are important to medicine, research, and discovery, although subsets of this information may be useful for some applications. The system presented also strives to store all other names by which each chemical is known and it associates these vernacular names back to the canonical structure.

Data Structure

Referring to FIG. 12, the chemistry model consists of structures that each have zero or more StructureAliases. The structure is uniquely identified by its isomeric SMILES, and each structure is assigned a unique identifier. "SMILES" is an acronym for Simplified Molecular Input Line Entry System. It is a simplified chemical notation that allows a user to represent a two-dimensional chemical structure in linear textual form for easy entry into a computer application.

TABLE 11

| IsomericSMILES | Isomeric SMILES of the chemical |
| CanonicalSMILES | Canonical SMILES; no isotope or stereochemistry information |

TABLE 12

| Alias | Common name of the chemical |
| Authority | Data provider from which the alias was obtained |
| Priority | Used to choose the 'best' name from a list of aliases on a Structure |
| ForeignId | Identifier assigned to the alias by the source Authority |
| CreatedVersion | Version number when this Alias was created. |
| DeletedVersion | Version number when this Alias was deleted. |

Chemistry Recognition

The chemistry recognizer operates similarly to the concept recognizer. The text and non-text entities in the document are scanned, analyzed, and compared to the collection of known structure aliases. In the case of chemistry, stemming is not performed.

In addition to the alias-based recognizer, automatic structure parsers are also applied to the document. Structure parsers interpret chemical text strings in formats such as SMILES, InChI, IUPAC, MDL MOL, and ChemDraw CDX. These recognized text strings are then registered into the structure table.

Relatedness

Chemical relatedness can be determined by computing the similarity of the chemical fingerprints. A chemical fingerprint is created by traversing all the paths, up to a maximum length, of the graph formed by the molecule's atoms and bonds. The characteristic signature formed by the union of these paths can be represented as a fixed-length binary number, typically about 1000 bits long. Then, a binary distance measure such as the Euclidian or Tanimoto coefficient can be computed for a pair of chemicals. Empirically, the most similar chemicals have the highest similarity coefficients; two chemicals which have a Tanimoto coefficient greater than 0.9 are almost always considered similar by a human chemist.

Given any 'probe' chemical, therefore, a set of related chemicals can be determined by finding all chemicals in the registration system that have high similarity to the probe. The size of this set can be adjusted by setting the minimum acceptable similarity coefficient.

Structure Searching

Structure searching is another type of chemical searching. Rather than searching by similarity, the objective is to find chemicals that contain, are contained by, or exactly match a probe molecule or pattern. Structure searching is implemented by representing each chemical as a graph, and then applying graph algorithms such as sub-graph matching. Fingerprint-based filters can be used to optimize the process, since if graph A is a sub-graph of graph B, then A's fingerprint will be a subset of B's fingerprint. Structure searching software is available from multiple sources, including commercial software from OpenEye Inc. and Daylight Inc., and free software from the Chemistry Development Kit project.

Structure Depiction

Visual depiction of chemicals can be very important to chemists. A picture of a chemical is frequently much more useful and conveys much more information than the chemical's name (in any format) or any single chemical property. But most documents do not contain structure depictions and even when they do they are often incorrect.

Referring to FIG. 19, the system can provide a depiction of any structure found in a document by generating the structure image dynamically from the SMILES representation. This depiction can be used alongside the definition provided by the concept model to provide context-sensitive reference information about a chemical structure.

Gene Model

Each gene in any organism can be represented completely by its nucleotide sequence. Sequences of newly discovered genes and fragments of genetic material are often printed directly in documents. In addition, many genes have been assigned technical and colloquial names, such as 'Bcl-xL', 'Wingless', 'Hedgehog' (and variations thereof), and it is quite common for genes to have three or more names by which they are frequently referred to.

The gene model used in the illustrative embodiment captures and stores the nucleotide sequence of all genes that are important to medicine, research, and discovery, although subsets may be useful for some applications. It also stores the names by which these genes are known and associates these names back to the sequence.

Data Structure

The gene model consists of genes, each of which has zero or more GeneAliases. The Gene is uniquely identified by its nucleotide sequence, and each gene is assigned a unique identifier.

TABLE 13

| | |
|---|---|
| Alias | Common name of the gene |
| Authority | Data provider from which the alias was obtained |
| Priority | Used to choose the 'best' name from a list of aliases on a Gene |
| ForeignId | Identifier assigned to the alias by the source Authority |
| CreatedVersion | Version number when this Alias was created. |
| DeletedVersion | Version number when this Alias was deleted. |

Gene Recognition

The gene recognizer operates similarly to the chemistry recognizer. The text and non-text entities in the document are scanned, analyzed, and compared to the collection of known gene aliases. As with chemistry, stemming is not performed.

In addition to the alias-based recognizer, automatic sequence parsers can also be applied to the document. Sequence parsers recognize nucleotide sequence text strings in formats such as FASTA, or simply as long strings of amino acid and nucleic acid codes. These recognized text strings are then registered into the gene table.

Relatedness

Genetic relatedness can be determined by computing the similarity of the gene sequences. Technically this can be accomplished by performing sequence alignment between two or more sequences using algorithms such as BLAST (Basic Local Alignment Search Tool). BLAST detects local as well as global alignment between nucleotide and amino acid sequences. Sequence alignment is well known to provide a useful measure of similarity.

Given a 'probe' gene or protein, a set of related genes may be determined by find all genes in the system that share a high degree of sequence alignment with the probe.

Location Model

The location model serves as a recognizer and registry of geographic locations such as named places and addresses.

Person Model

The person model serves as a recognizer and registry of people, typically document authors but in general anyone associated with a document. People are recognized by examining structured and unstructured content in documents. Because of the wide variation with which names are given, used, and changed, a fully deterministic method for recognizing names has not been devised. The system therefore recognizes common patterns in which names are expressed [for example: LastName, FirstName (, MiddleInitial)?], and whenever possible it attempts to analyze sections of a document to which the names are confined. When accessing structured documents such as research papers, the author names are often listed in a separate field from the other contents of the document (e.g. the 'author' field). Other structured documents may have their own structured or semi-structured representation of authors, meeting attendees, etc.

Data Structure

The person model consists of persons, each of which has an ID and one or more PersonAliases. Because many people may share the same name, each alias may be listed multiple times, associated with different people.

TABLE 14

| | |
|---|---|
| Alias | A complete name by which the person may be identified in a document. |
| Authority | Data provider from which the alias was obtained |
| Priority | Used to choose the 'best' name from a list of aliases on a Structure |
| ForeignId | Identifier assigned to the alias by the source Authority |

Person Recognition

The person recognizer examines documents for occurrences of the registered aliases. In addition, it examines structured fields for known person-representing data structures, and it examines the text of the documents for common person-naming patterns. Once a person has been associated with a document by the recognizer, the system provides curators with the opportunity to correct the assignments.

Relatedness

Person relatedness is determined by examining the documents associated with the people, and then comparing these documents for similarity. This technique can determine that two people who are associated with documents that have similar content have similar knowledge and are working in similar fields. The fingerprinting techniques described in this document provide an effective and efficient way to rapidly compare the similarity of many documents, and so compare the similarity of the associated people.

Recognizer Interface

The following is illustrative C code for the recognizer interface.

```
/**
 * Recognizes an input text item and returns a token list that tokenizes the text and
 * marks the beginning and end of concepts.
 */
public interface Recognizer {
    /**
     * Gets the version of the model that is implementing the recognizer. When the
     * version is incremented, clients that are caching or indexing recognition results
     * will know that they need to update.
     */
    int getModelVersion( );
    /**
     * Applies the recognition method to a single item and returns a sequence of tokens.
     */
    Recognition recognize(TextField field);
    /**
     * Applies the recognition method to a series of fields.
     */
    Recognition[ ] recognizeBatch(TextField[ ] fields);
    /**
     * Gets the {@link TopicId ids} of topics that existed in <code>oldVersion</code> but
     * have been changed or removed on or before <code>newVersion</code>.
     */
    TopicId[ ] getChangedTopics(int oldVersion, int newVersion);
    /**
     * Gets the {@link TopicId ids} of topics that were added between <code>oldVersion</code>
     * and <code>newVersion</code> of the recognizer model.
     */
    TopicId[ ] getAddedTopics(int oldVersion, int newVersion);
    /**
     * Gets the logical name of the recognizer. Should be a single plain word in lower
     * case.
     */
    String getName( );
}
/**
 * Extracts entity class and entity Id information from a topic Id.
 */
public class TopicId {
    private String assignedId;
    private TopicType tt;
    public TopicId( ) {
    }
    public TopicId(TopicType tt, String assignedId) {
        this.tt = tt;
        this.assignedId = assignedId;
    }
    public TopicType getTopicType( ) {
        return tt;
    }
    public void setTopicType(TopicType tt) {
        this.tt = tt;
    }
```

```
    public String getAssignedId( ) {
       return assignedId;
    }
    public void setAssignedId(String assignedId) {
       this.assignedId = assignedId;
    }
}
/**
 * Returns the result of applying a {@link Recognizer} method to a text
 * field input.
 */
public class Recognition
   implements Serializable
{
   private static final long serialVersionUID = 2;
   private int modelVersion;
   private int[ ] openIndices;
   private int[ ] closeIndices;
   private String[ ] topicIds;
   public Recognition( ) {
   }
   public Recognition(int modelVersion, String[ ] topicIds, int[ ] openIndices, int[ ] closeIndices) {
      this.modelVersion = modelVersion;
      this.topicIds = topicIds;
      this.openIndices = openIndices;
      this.closeIndices = closeIndices;
   }
   /**
    * Gets the version of the recognizer that was used to create this Recognition.
    */
   public int getModelVersion( ) {
      return modelVersion;
   }
   public void setModelVersion(int modelVersion) {
                this.modelVersion = modelVersion;
         }
   /**
    * Gets the positions in the input text string at which each recognized topic terminates.
    * Each value in this array corresponds to the same-indexed value in {@link #getTopicIds( )}.
    */
   public int[ ] getCloseIndices( ) {
                return this.closeIndices;
         }
   public void setCloseIndices(int[ ] closeIndices) {
                this.closeIndices = closeIndices;
         }
   /**
    * Gets the positions in the input text string at which each recognized topic begins.
    * Each value in this array corresponds to the same-indexed value in {@link #getTopicIds( )}.
    */
       public int[ ] getOpenIndices( ) {
                return this.openIndices;
       }
       public void setOpenIndices(int[ ] openIndices) {
                this.openIndices = openIndices;
       }
       /**
        * Gets the encoded identifier of each topic that was recognized in the input text string.
        *
        * @see TopicId#encode( )
        */
       public String[ ] getTopicIds( ) {
                return this.topicIds;
       }
       public void setTopicIds(String[ ] topicIds) {
                this.topicIds = topicIds;
       }
}
```

Example Methods of Use

Table 15 shows illustrative examples of the use of systems according to the invention in the search, organization, and analysis of document-based information.

TABLE 15

| Step | Example(s) | Description(s) |
|---|---|---|
| 1. Issue a query | "Wellbutrin is used for smoking cessation. What other antidepressants like wellbutrin have indications in stopping smoking and other drug abuse syndromes?" | In this query, the phrase " . . . like wellbutrin . . . " has special meaning. In a cheminformatics sense, "like" refers to the similarity between chemical graphs; for example, the Tanimoto coefficient of the fingerprints. Typically Tanimoto similarities that are >90% are considered close in structural type. The method parameters such as the similarity threshold may be configured system-wide or tuned by the user. In addition, substructures can be used for exact searches. In this instance the question would have the following structure. In this case a substructure of wellbutrin is input in context of syntax of the query. |
|  | "Wellbutrin is used for smoking cessation. What other antidepressants with 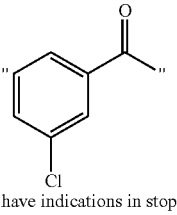 have indications in stopping smoking and other drug abuse syndromes?" | May combine publicly known chemistry with private chemical libraries such as the R&D registry of a pharmaceutical company. |
| 2. Display and organize the most relevant hits from the search. This organization can be adapted to the user's specific needs | (See Fig. 20) | Clinical trials are from the US FDA clinical trial site. System provides differential diagnosis of the diseases that most fit the issued query. This is a partial list. System provides a listing of the drug treatments that best fit the issued query. Again this is a partial list. Clonidine is highlighted to indicate the ability to derive the chemical structure from drug names. System would access proprietary data such as reports and organize the output to contain this information. |
| 3. Organization and analysis of the search results provides the ability to associate higher level concepts such as depression, substance withdrawal, addiction, etc. with entities such as compounds, biological |  | Compounds will be annotated with higher level concepts, as described, on the basis of the structural similarity with literature compounds. Annotations will also occur based on other User compounds and their concept information. Diseases, treatments, biological mechanisms of action, proteins, genes, polymorphisms, familial disorders etc. will be annotated with compound information |

TABLE 15-continued

| Step | Example(s) | Description(s) |
|---|---|---|
| mechanisms, proteins and genes etc. | | according to the structural similarity between User's compounds and any agents known to be associated with the concept. In summary User's compounds will be annotated according to literature associations and medical concepts within the literature will be annotated with User's compounds. |
| 4. Cheminformatics processes can be used to further analyze the compounds retrieved from the query | Clustering based on structure. Property calculation. Maximally common substructure. Scaffold and fragment detection. Directed pharmacophore detection. Library design. Etc. | |
| 5. Depending on requirements, more advanced processes can be created to help answer specific drug discovery and development questions. Classes of questions are as follows but other advanced solutions to issues can be created. | "Given the current project portfolio, are there new drug target opportunities that are well aligned with our current chemistry?" | Enhancing the current drug discovery project portfolio |
| | "Are there toxicities that are related to the chemical class and the apparent biological profile of this class of compound?" | Identifying potential down-stream issues with chemical classes such as toxicity and off-target effects |
| | "Given the drugs in development, are there new indications that may be related to the chemical class that have not yet been identified?" | Identifying new indications for current development candidates that relate to the chemical class |
| | "Given the current drug portfolio, are there new opportunities to add indications, reposition into new indications or create combinations that are able to realize increased value?" | Enhancing the current drug portfolio with new indications, repositioning or drug combinations. |

The questions for each of the advanced solutions are for demonstration purposes only. The exact nature and syntax of the questions can vary according to the problem addressed. In addition, a single query may not provide the answer for complex questions, and the answer(s) for each problem may demand a series of focused questions.

Document Recognition

This section discusses the document recognition process in more detail for different aspects of the invention, including an implementation that uses a plug-in architecture to recognize concepts in third-party document access tools.

Documents frequently contain specialized terminology. This terminology may be unfamiliar to a reader, and even if familiar there may be important additional meaning that can be attached to the terms. For example, scientific papers in the life sciences often describe the application of a body of well-known techniques to a mixture of known and unknown biological and chemical phenomena. These phenomena are often strongly associated with a term or terms; for example, the name of a gene, the IUPAC name of a chemical compound, the scientific name of an organism. Unlike the terminology of everyday language whose meaning is frequently ambiguous and heavily dependent on context, scientific terms are often unique (or nearly so), and the term itself conveys a wealth of information about the concept it identifies.

A variety of computer programs for document editing and viewing are in widespread use. Most of these programs provide the ability to extend their functionality through a plug-in Architecture. The Microsoft Office suite, for example, is extendable through its Visual Basic for Applications (VBA) language, programmable through COM APIs, and provides a variety of specialized plug-in specifications such as smart tags. Web browsers such as Internet Explorer and Firefox also provide plug-in capabilities, as does the Adobe Acrobat Reader.

In each case, the plug-in capabilities can be used to extend the program to perform the tasks of term recognition and action. As used here, the term recognition refers to the process of identifying a known term within the text of a document. Action is a follow-on process whereby the user can instruct the plug-in to perform some context-driven process based on a recognized term.

The invention can be used to implement a general-purpose mechanism for the process of term recognition and action across a vast repository of known terms. Each term is associated with one or more concepts. A hierarchical graph of these concepts is then used to look up the actions available for these concepts, which are then presented to the user.

The process of "term recognition and actions" described in this document can be applied to any electronic text or text that can be converted or recognized and processed using the described methods. The text can be in any format, displayed from any program and can be in any language, provided that it can be processed by the described methods.

Summary

Overview

This section describes an aspect of the invention which recognizes document entities, referred to in this document as 'terms'. The word 'term' as used here means any entity found in a document. For example: single words, phrases, acronyms, technical terms, text encodings of entities (e.g. chemical compounds identified by SMILES or IUPAC name, gene and protein sequences), images, embedded objects (e.g. ActiveX controls).

These terms are present in documents such as word processing documents, spreadsheets, web pages, and book readers. A general-purpose recognizer can be applied to any document to produce a list of possible terms. This list of terms is screened and then verified with a server program, which determines whether each term is known. Each known term identifies one or more known concepts. The concepts are stored in a repository (an ontology), where they are organized according to known relationships. Programmatic behavior in the form of actions are associated with the concepts in this repository by attaching the actions to the concept nodes. Actions and other properties are inherited through is_a relationships in the concept ontology.

For each recognized term, the document program can then present menu options (based on the actions) to the user. In this manner, the invention can dynamically attach programmatic behavior with the content of a document, requiring no assistance from or direct action by the user. For example, smart tags in Microsoft Word can be used to present a floating menu of background information for a term in the document while it is being accessed in that program.

System

The list of terms, the structure of the ontology, and the annotation of the ontology with actions are all updated frequently. To simplify management of the system, the master term list and the ontology may be stored on a separate machine (server). There are thus two primary components to the system: a client running a document reading and/or authoring program, and a server which maintains the list of terms and the organization of concepts as an ontology. The client and server may be separate machines, separate process on the same machine, or may even run in the same process.

Storing the term list and the ontology on a server that is separate from the client facilitates centralized management of the system. Updates to the term list, the ontology, and the actions (collectively known as the concept repository) are all centrally managed. Changes to the concept repository are propagated automatically to the clients when they open a new document or re-scan an existing document.

The ontologies and the nodes within the ontologies can be used to implement enterprise management features such as permissions, partitioning of information and security. For example, an ontology built for one working group might be visible or invisible to another group. Or such a rule could be applied to a node within an ontology and applied to all the descendents of that node.

Term Index

Clients do not need to store an entire term list locally in order to recognize terms. A compressed term index is instead constructed on the server and sent to each client when they initialize.

Some terms resist explicit enumeration. For instance, every chemical compound can be assigned a unique name according to the IUPAC (International Union of Pure and Applied Chemistry) standard. And because the number of possible chemical compounds is essentially infinite, the number of valid IUPAC names is also essentially infinite. In these cases where it is not possible to build a list of terms, an algorithm can often be constructed that will determine whether a phrase is a valid member of a class of terms.

Text Analyzer

The client recognizer begins by examining the entities (text and non-text) in the document. Non-text entities such as images, ActiveX controls, may be recognized as concepts using specialized methods. Text entities are pre-processed by a text analyzer and then submitted to the recognizer. The text analyzer proceeds in three stages Partitioning of the body of text into phrases
Partitioning of phrases into words (tokens)
Assignment of token types to tokens
A token type assigns a general category to a token, such as email address, acronym, abbreviation, identifier, word.

Each stage of the analyzer is controlled by a sequence of regular expressions. These regular expressions can be maintained on the server and loaded dynamically by the client. In this way, the exact behavior of the text analyzer can be centrally controlled. The text analyzer can even behave differently for different users based on their preferences. For instance, a user who is a chemist may use an analyzer that is targeted towards recognition of chemical names. The analyzer used by a biologist may be optimized for names of genes and gene products.

Recognition Process

The token lists generated by the text analyzer are used to generate single words and word phrases which may be known terms. The recognition process is applied to each possible term. This process takes advantage of several known properties of terms A multi-word term cannot span across phrases (e.g. across two sentences)
The maximum number of words in a term is known
For any given sequence of tokens, the system generates all possible single and multi-word phrases that meet the above constraints. Each of these candidate phrases is sent to the Recognizer and has the potential to be recognized as a term.

Actions

Once a term has been recognized and associated with a concept, the system now has an understanding of the meaning of the word, in the sense that the location of the concept within the ontology puts it in the context of all other known concepts.

For each recognized concept, the system can present an organized list of actions that can be taken by the user. This list of actions is context-dependent. The actions available for a chemical compound (e.g. a drug), a gene, a gene product (e.g. a protein) are different, with some in common and some unique. The set of actions for a concept is computed using the action assignment process.

Each action is associated with a program or script. When the action is selected by the user, this program is loaded and executed. Contextual information about the selected concept and its place in the document is passed to this action program.

Examples of actions include, but are not limited to, inserting the definition of a term into the document, offering context-specific search engine queries (i.e., GenBank for genetic terms, ChemBank for chemistry, etc.), offering domain-specific search engine queries (i.e., PubMed, OMIM, SwissProt, etc.), inserting structures to replace biological and chemical molecules, finding of homologous genes for a specified gene name, finding journal publications for a specified term, reporting all synonyms for a term, term completion, etc.

Figure 21:
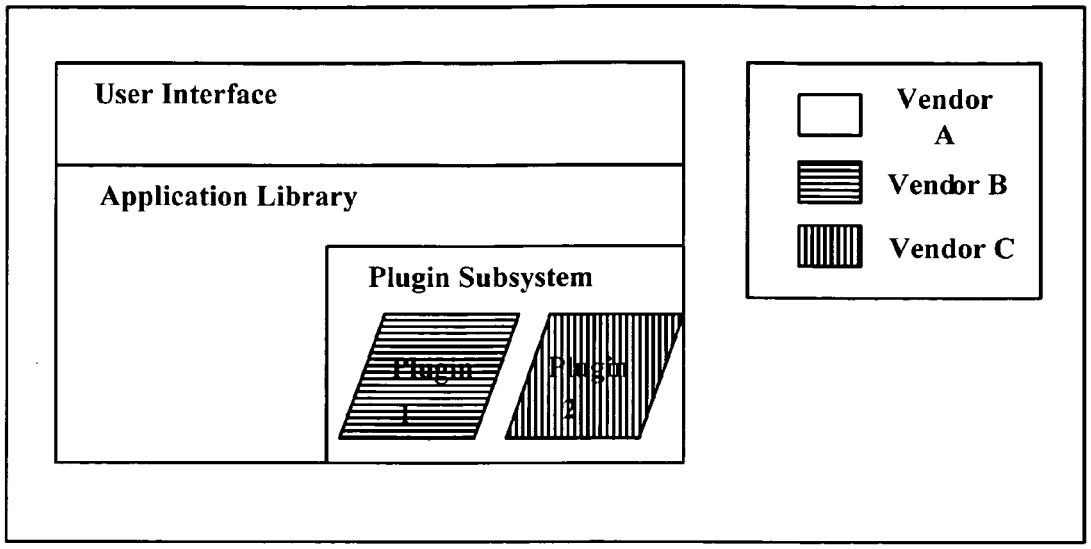
FIG. 21 is a block diagram illustrating a plug-in architecture that can be used in connection with the system of FIG. 1.

Referring to FIG. 21, the system may employ a plug-in architecture. It the example shown, the architecture is shown for an application implemented by vendor A. Vendor A's code implements the user interface, the main application code, and the plug-in subsystem. Code from other vendors (as well as vendor A itself) can be loaded by the plug-in subsystem. Plug-in code is exposed by the plug-in subsystem to the user interface.

Term Index Construction and Usage

Figure 22:
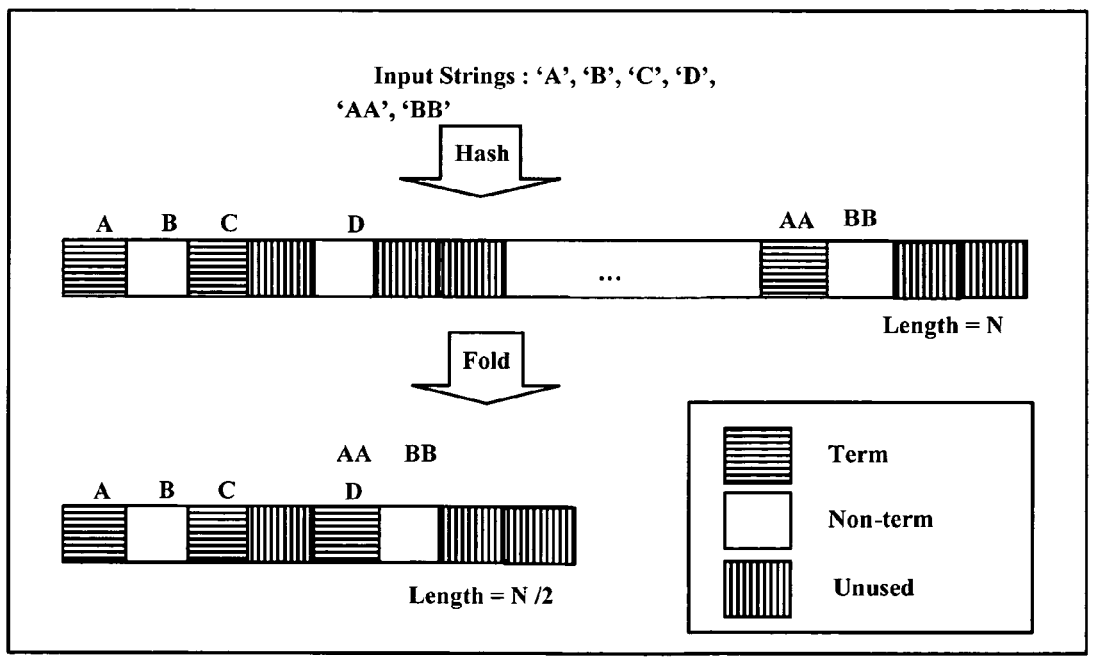
FIG. 22 is a flow diagram illustrating term index construction steps that can be used in connection with the system of FIG. 1.

An implementation for term index construction and usage is outlined in FIG. 22 and operates as follows:

1. Each input string is converted into a numerical hash value by applying a hash function.

2. The location of each hash value is marked in a bit vector.

3. Some positions in the bit vector are not the hash value of any possible input. These are shown as 'unused' in the diagram.

4. The folding process applies the logical OR operation to the two halves of the bit vector. The resulting bit vector is called the folded bit vector.

5. Folding reduces the space occupied by the term index by half and typically increases the fraction of bits that are marked.

6. After folding, AA and D hash to the same value. Therefore, a term index client will incorrectly believe that 'D' is a known term.

7. The term index may be folded until the desired density of marked values is achieved.

8. The client computes the hash value of an input string that may or may not be a known term. If the hash value of the input string is marked in the term index, then the input string may be a term. If the hash value is not marked, the input string is definitely not a term.

9. Because words may be encountered in many forms (different tenses, singular, plural, etc) the terms may be stemmed before the hash value is computed. A popular stemming algorithm is the Porter Stemmer.

Text Analyzer

Referring to FIG. 18, the text analyzer implements the important process of inferring the structure of the text. Tokens and token types are used to form terms which are looked up in the term index. Tokens are processed before they are sent to the term index. For example, 'word' tokens may be converted to lower case so that they are matched regardless of case ('Limited' is the same word as 'limited'), whereas the case of 'acronym' tokens is preserved ('LLC' is not the same word as 'llc').

Recognition Process

Figure 23:
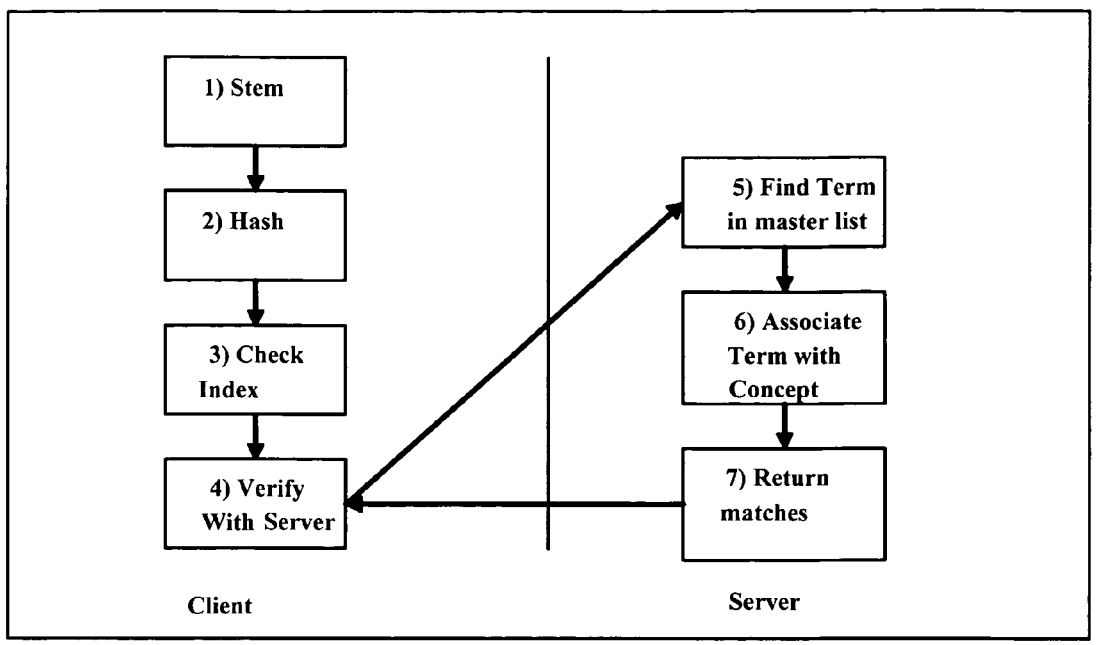
FIG. 23 is a flow diagram illustration term lookup steps that can be used in connection with the system of FIG. 1.

Referring to FIG. 23, after the text is analyzed, the client uses the term index to rapidly identify document entities (single words or groups of words) which are non-terms. Document entities which are found in the term index are probably terms, but are not necessarily so. In the second phase of the recognition process, the possible matches are sent to the server, where each term is confirmed and associated with a master concept. The confirmed terms and the association to a master concept are returned to the client. The document program on the client provides the user with some visual feedback for each recognized term. Based on a user action such as a menu selection or a mouse click, the document program may then present the user with a list of actions that are available for the term.

An optional stemming algorithm such as the Porter Stemmer can be applied to the input string. The output of this step is a modified input string. A hash value is computed for the input string using the same algorithm that was used to build the term index. The bit vector position corresponding to the hash value is then examined. If this bit position is set, the input string may be a term. If it is not set, the input string cannot be a term and the recognition process for this input string is terminated. All of the input strings that were found in the hash index are collected and sent to the server. The server looks for each term in the master term list. False positives are discarded in this step. Each recognized term is associated with a concept. There may be multiple terms for each concept (in other words, a single concept may be known by multiple synonyms). The subset of the input strings that have been verified as known terms is returned to the client. The associated concept for each term may be returned as well.

Action Assignment

Figure 24:
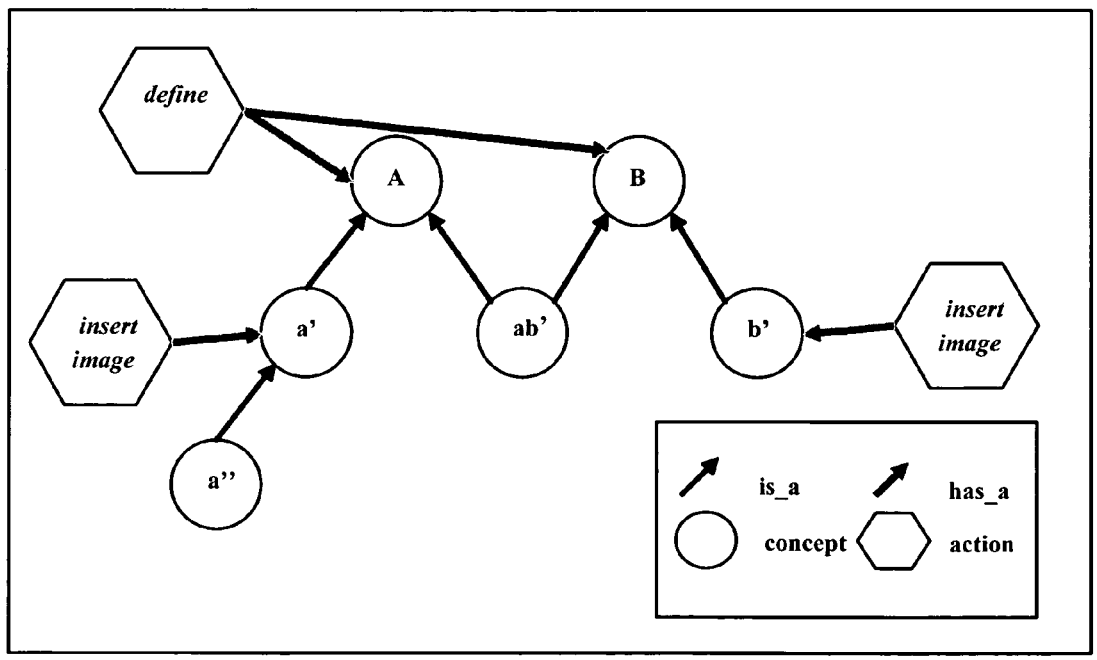
FIG. 24 is an ontology relationship diagram illustrating relationships for concepts and actions in an ontology that can be used in connection with the system of FIG. 1.

Referring to FIG. 24, actions can be attached to concepts in ontologies. This functionality can be implemented as follows:

1. Relationships (connections between concepts) have a semantic meaning attached to them.

1.1. Relationships are directed. The origin of the relationship is called the subject and the destination of the relationship is called the object.

1.2. The is_a relationship means that the subject is a specialization of the object. This relationship has the same connotation as type inheritance in computer programming.

1.3. A concept A is a parent of concept a if there is an is_a relationship having a as its subject and A as its object.

1.4. a is a descendant of A if there is a path from a to A along is_a relationships.

1.5. A is an ancestor of a if a is a descendent of A.

1.6. The has_a relationship means that the subject (an action) may be applied to the object (a concept), and to all children of the object.

2. The set of available actions for a concept a is determined by looking at the actions attached to a, and at the actions attached to all ancestors of a. In other words, actions are inherited through is_a relationships.

3. An action may be attached to more than one concept (in the example above, define).

4. More than one action with the same name (in the example above, insert image) may be defined in the ontology.

EXAMPLE 1

Figure 25:
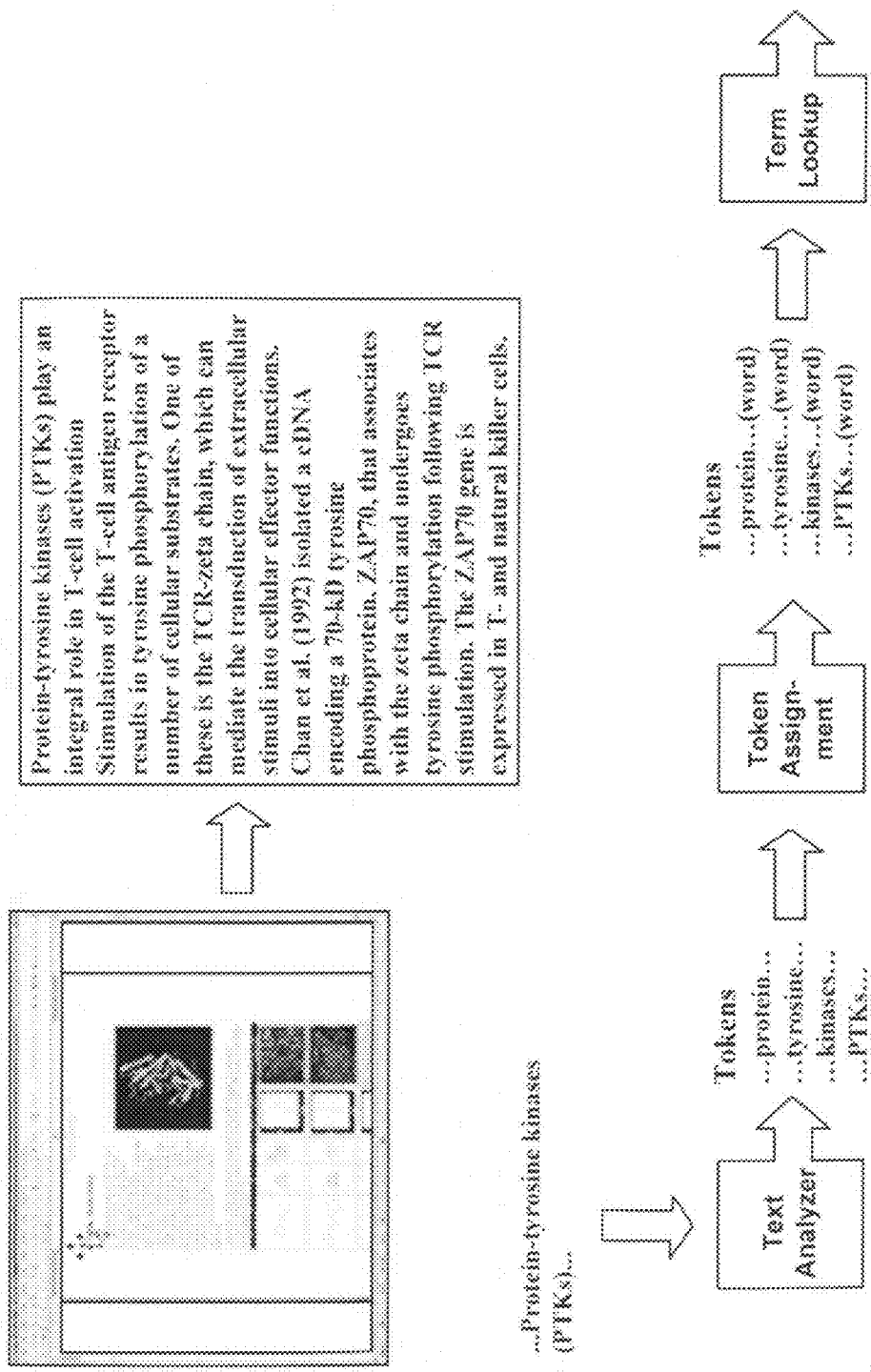
FIG. 25 is diagram illustrating an example relating to the recognition of terms within a Microsoft Word document with biological content.

An example of recognition of terms within a Microsoft Word document is shown in FIG. 25. The document contains complex data; formatted text, pictures (ActiveX and static JPEG) and a table with hyperlinked data within the cells. Parsing of the document into "terms" that can be processed (recognition of the terms, tokenizing and lookup) provides rich functionality. In this example only the words "Protein-tyrosine kinases (PTKs)" are processed. Once terms have been processed and their "position" in a hierarchical concept tree or ontology recognized, relationships to all other concepts within the ontology is determined. These relationships provide the ability to capture related-ness and similarity, and provide access to various actions.

Figure 26:
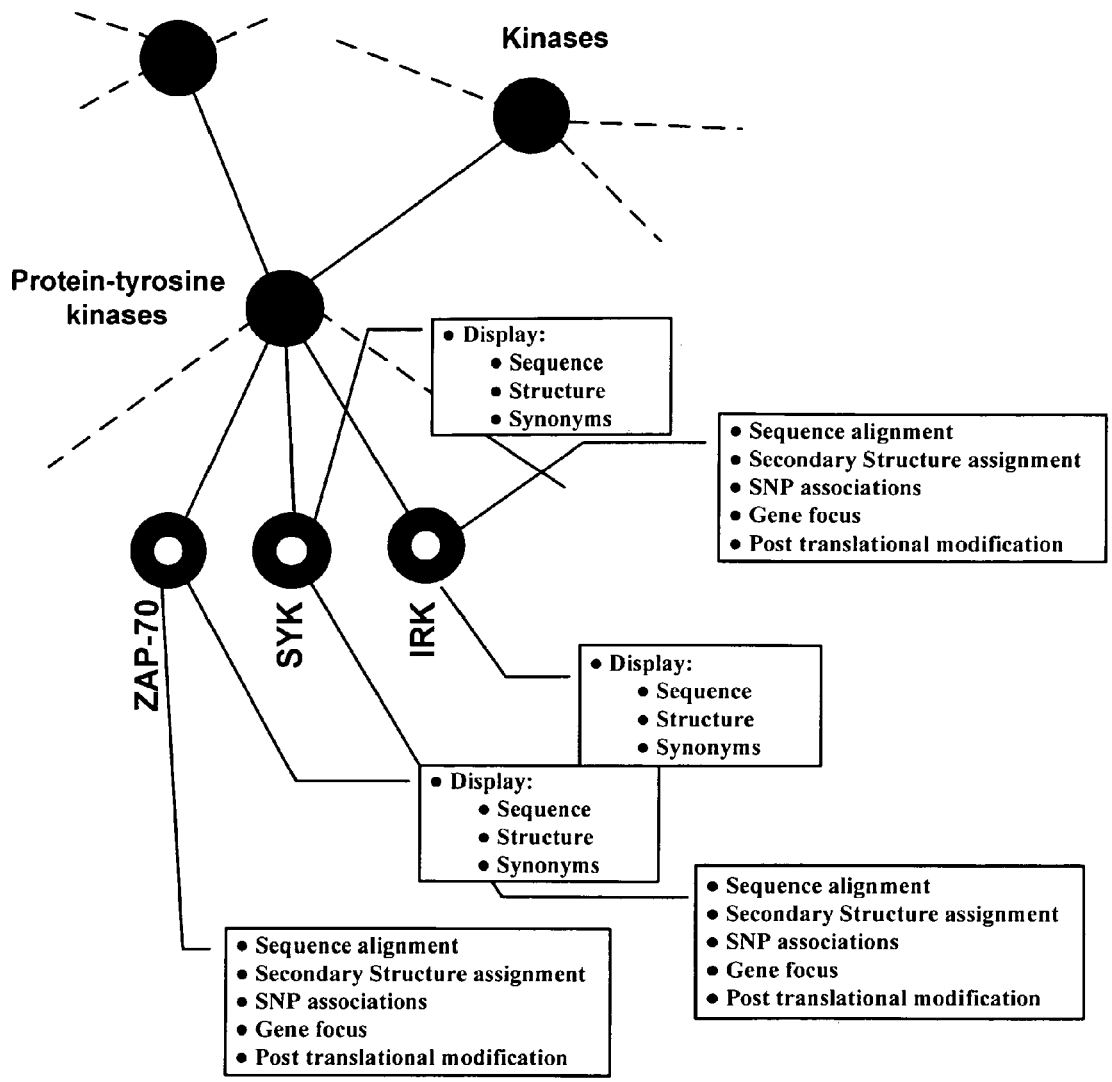
FIG. 26 is a diagram illustrating a first example of actions that may result from recognized terms for the example of FIG. 25.

Referring to FIG. 26, possible actions for the concepts "ZAP-70", "SYK" and "IRK" are shown in square boxes. The concepts are shown as spherical nodes. The concept "Protein-tyrosine kinases" is a child of "Kinases" (as is "Ser-Thr Kinases", not shown) and is a parent of "ZAP-70", "SYK" and "IRK", among others. Examples of actions available from "ZAP-70", "SYK" and "IRK", as from all proteins, are "Display" (sequence, structure, synonyms etc.) and functions such as "Sequence Alignment", "Secondary Structure Assignment", "SNP Associations", "Gene Locus" and sites of "Post-transcriptional Modification" etc.

EXAMPLE 2

Figure 20:
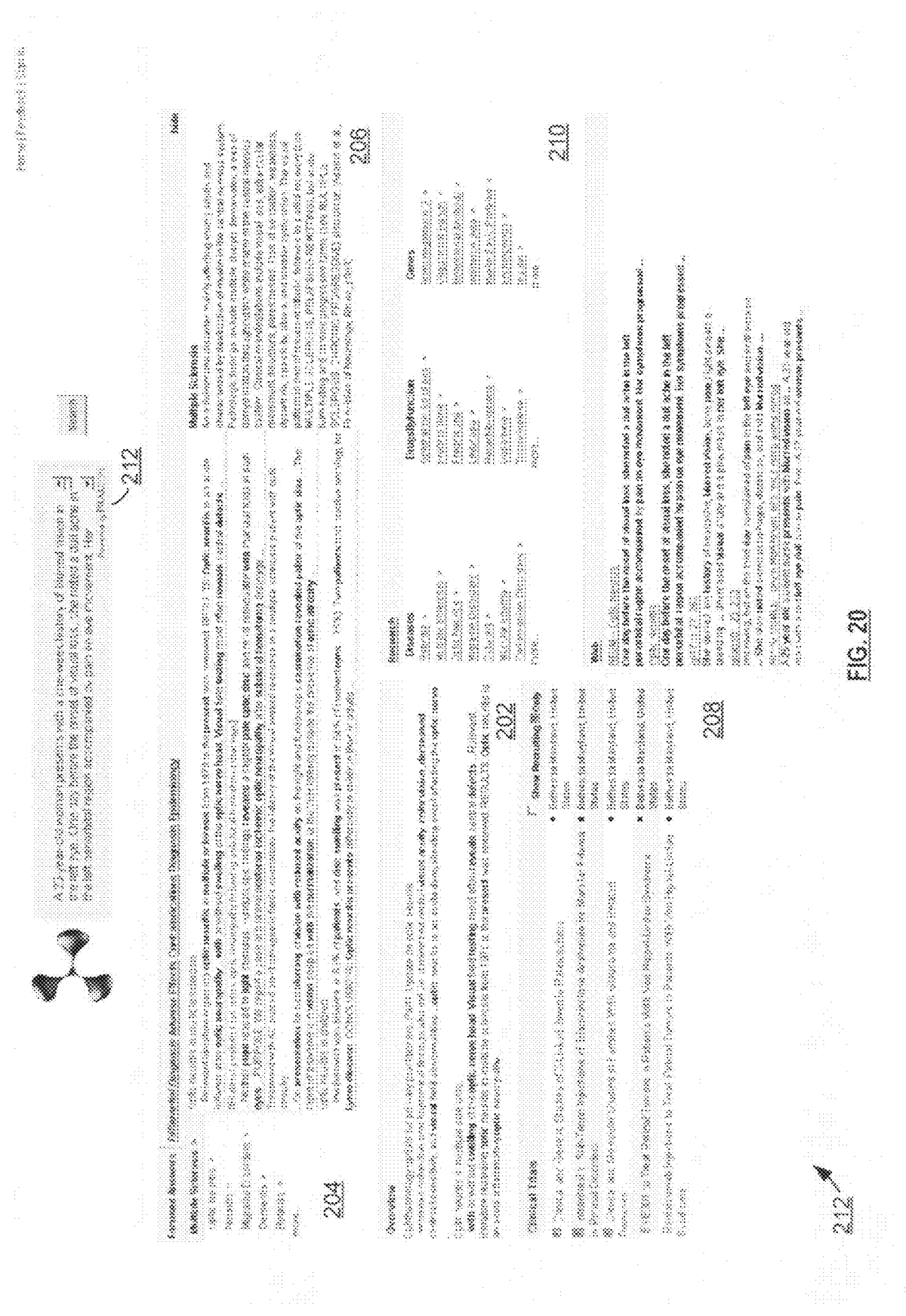

Referring to FIG. 20, the search system can use a browser-based user interface that provides the user with separate result areas that are processed differently to provide a highly interactive and information-rich response to a query. This interface can present a page 200 that includes an overview area 202, a disease area 204 with its own background area 206, a clinical trials area 208, a web results area 210, and a research area 210 in addition to a query entry area 212. The research area is divided into sub-areas that list diseases, drugs by function, and genes relevant to the query. As discussed above, the content presented in these different areas can be derived with information from the topic models.

The present invention has now been described in connection with a number of specific embodiments thereof. However, numerous modifications which are contemplated as falling within the scope of the present invention should now be apparent to those skilled in the art. Therefore, it is intended that the scope of the present invention be limited only by the scope of the claims appended hereto. In addition, the order of presentation of the claims should not be construed to limit the scope of any particular term in the claims.

What is claimed is:

1. A computerized search system comprising a processor and a storage device including instructions that are configured to run on the processor for accessing digitally stored data, comprising:
   a document interface configured to access a plurality of digitally stored documents that each includes content that relates to one or more subject matter topics,
   a topic model interface configured to access one or more digitally stored topic models that each classify information about one of the subject matter topics that can occur in the content, wherein the topic model interface is configured to access topic models that include hierarchical concept maps that map each of one or more ancestor concepts to a plurality of descendent concepts,
   document fingerprinting logic embodied in the computerized search system and responsive to the digitally stored topic models through the topic model interface and to the digitally stored documents through the document interface, and configured to create document fingerprints that each include a set of identifiers that each identify one of the topics from the digitally stored topic models in the content of the digitally stored documents,
   a query interface configured to receive user-specified queries,
   query fingerprinting logic embodied in the computerized search system and responsive to the digitally stored topic models through the topic model interface and to queries through the query interface, and configured to create query fingerprints that identify topics from the stored topic models in the queries, and
   search logic embodied in the computerized search system and configured to identify one or more of the digitally stored documents that are relevant to the queries, based on the query fingerprints and the document fingerprints.

2. The system of claim 1 wherein the search logic includes an indexer configured to index the document fingerprints, and a search engine configured to search the index based on the query fingerprints.

3. The system of claim 2 further including analysis and augmentation logic configured to modify the document and/or query fingerprints before processing by the indexer or search engine.

4. The system of claim 3 wherein the analysis and augmentation logic is responsive to curation input.

5. The system of claim 3 wherein the analysis and augmentation logic includes context-sensitive meaning scope adjustment logic configured to expand or restrict topics identified by a term in a fingerprint to a set of the meanings associated with that term.

6. The system of claim 3 wherein the analysis and augmentation logic includes species augmentation logic configured to add specific examples of a generic topic.

7. The system of claim 6 wherein the species augmentation logic operates based on chemical similarity or biological sequence similarity.

8. The system of claim 6 wherein the species augmentation logic operates based on predefined hierarchical relationships between topics.

9. The system of claim 2 further including a ranker responsive to the stored topic models and configured to rank topics from a set of fingerprints or search engine results.

10. The system of claim 2 further including a result presentation interface responsive to the search engine and configured to present results to the user in a manner that is based on the document fingerprints.

11. The system of claim 1 further including an alert interface configured to generate alerts based on the fingerprints.

12. The system of claim 1 wherein the topic models include topical models and location models.

13. The system of claim 1 wherein the topic models include topical models and taxonomic models.

14. The system of claim 1 wherein the topic models include topical models and biographical models.

15. The system of claim 1 wherein the topic models include topical models and historical models.

16. The system of claim 1 wherein the topic models include topical models and disease diagnosis models.

17. The system of claim 1 wherein the topic models include topical models and disease treatment models.

18. The system of claim 1 wherein the topic models include topical models and chemical models.

19. The system of claim 1 wherein the topic models include topical models and genetic models.

20. The system of claim 1 wherein the topic models include medical treatment and diagnosis models.

21. The system of claim 1 wherein the topic models include topical models and industrial classification models.

22. The system of claim 1 wherein the query fingerprinting logic and the document fingerprinting logic operate in the same way.

23. The system of claim 1 further including a topical model update interface configured to update the topical models.

24. The system of claim 23 wherein the topical model update interface is responsive to curation input.

25. The system of claim 23 further including a topical model version management system configured to selectively update a subset of document fingerprints in response to changes to the stored topical models.

26. The system of claim 1 wherein the query fingerprinting logic is configured to generate fingerprints based on free-form naturally posed queries.

27. The system of claim 1 wherein the query interface is part of a syndication filtering tool.

28. The system of claim 27 further including a feedback mechanism responsive to user feedback to update a syndication query fingerprint.

29. The system of claim 27 wherein the query interface is part of a syndication filtering tool that includes a plug-in interface to a document access tool.

30. The system of claim 29 further including a feedback mechanism responsive to user feedback to update a syndication query fingerprint for the syndication tool through the plug-in interface.

31. The system of claim 1 further including classification logic configured to assist in locating documents in predetermined classes.

32. The system of claim 1 wherein at least one of the topic models includes synonym tables that can narrow or expand the range of synonyms associated with a term in the context of that model.

33. The system of claim 1 further including topic-based post-search processing logic responsive to the topic models and the search logic, and configured to selectively access, based on the topic models, information from result sets produced by the search logic.

34. A computer implemented method, employing a processor and a storage device including instructions that are configured to run on the processer, comprising:
accessing digitally stored documents that each include that relates to one or more subject matter topics,
accessing one or more topic models that each classify information about one of the subject matter topics that can occur in the content, wherein the step of accessing accesses topic models that include hierarchical concept maps that map each of one or more ancestor concepts to a plurality of descendent concepts,
fingerprinting the documents accessed in the step of accessing documents based on the topic models accessed in the step of accessing topic models,
accessing one or more user-specified queries,
fingerprinting the queries accessed in the step of accessing queries based on the topic models accessed in the step of accessing topic models, and
detecting similarities between fingerprints produced by the step of fingerprinting documents and the step of fingerprinting queries.

35. A computerized search system, comprising a processor and a storage device including instructions that are configured to run on the processor for accessing digitally stored data, comprising:
means for accessing digitally stored documents that each content that relates to one or more subject matter topics,
means for accessing one or more topic models that each classify information about one of the subject matter topics that can occur in the content,
means for fingerprinting documents accessed by the means for accessing documents based on the topic models accessed by the means for accessing topic models,
means for accessing one or more user-specified queries, wherein the means for accessing accesses topic models that include hierarchical concept maps that map each of one or more ancestor concepts to a plurality of descendent concepts,
means for fingerprinting the queries accessed by the means for accessing queries based on the topic models accessed by the means for accessing topic models, and
means for detecting similarities between fingerprints produced by the means for fingerprinting documents and the means for fingerprinting queries.

* * * * *